United States Patent
Fujiwara et al.

(10) Patent No.: US 8,749,010 B2
(45) Date of Patent: Jun. 10, 2014

(54) INFRARED IMAGING DEVICE AND METHOD FOR MANUFACTURING SAME

(75) Inventors: Ikuo Fujiwara, Kanagawa-ken (JP); Hitoshi Yagi, Kanagawa-ken (JP); Keita Sasaki, Kanagawa-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 13/426,097

(22) Filed: Mar. 21, 2012

(65) Prior Publication Data

US 2012/0175723 A1 Jul. 12, 2012

Related U.S. Application Data

(63) Continuation of application No. PCT/JP2010/051413, filed on Feb. 2, 2010.

(51) Int. Cl.
*H01L 27/146* (2006.01)
*H01L 31/058* (2006.01)

(52) U.S. Cl.
USPC .... 257/444; 257/467; 257/469; 257/E27.136; 257/E31.038

(58) Field of Classification Search
USPC .......... 257/467, E31.054, 444, 469, E27.136, 257/E31.038; 438/54
See application file for complete search history.

(56) References Cited

U.S. PATENT DOCUMENTS

| | | | | |
|---|---|---|---|---|
| 2001/0028035 | A1* | 10/2001 | Iida et al. | 250/338.4 |
| 2009/0101821 | A1* | 4/2009 | Masafumi | 250/338.3 |
| 2009/0236526 | A1 | 9/2009 | Sasaki et al. | |

FOREIGN PATENT DOCUMENTS

| | | |
|---|---|---|
| JP | 2000-340848 | 12/2000 |
| JP | 2002-181627 | 6/2002 |
| JP | 2002-181627 A | 6/2002 |
| JP | 2003-106894 | 4/2003 |
| JP | 2003106894 * | 4/2003 |
| JP | 2005-221334 | 8/2005 |
| JP | 3715886 | 9/2005 |
| JP | 2005-303325 | 10/2005 |
| JP | 2009-109473 | 5/2009 |
| JP | 2009-109473 A | 5/2009 |

OTHER PUBLICATIONS

International Search Report issued Mar. 9, 2010 in PCT/JP2010/051413 filed Feb. 2, 2010.
Japanese Office Action issued on Feb. 20, 2013, in patent Application No. 2011-552597 with English translation.

* cited by examiner

*Primary Examiner* — George Fourson, III
*Assistant Examiner* — Wilner Jean Baptiste
(74) *Attorney, Agent, or Firm* — Oblon, Spivak, McClelland, Maier & Neustadt, L.L.P.

(57) ABSTRACT

According to one embodiment, an infrared imaging device includes a substrate, a detecting section, an interconnection, a contact plug and a support beam. The detecting section is provided above the substrate and includes an infrared absorbing section and a thermoelectric converting section. The interconnection is provided on an interconnection region of the substrate and is configured to read the electrical signal. The contact plug is extends from the interconnection toward a connecting layer provided in the interconnection region. The contact plug is electrically connected to the interconnection and the connecting layer. The support beam includes a support beam interconnection and supports the detecting section above the substrate. The support beam interconnection transmits the electrical signal from the thermoelectric converting section to the interconnection.

18 Claims, 15 Drawing Sheets

INFRARED IMAGING DEVICE AND METHOD FOR MANUFACTURING SAME

CROSS-REFERENCE TO RELATED APPLICATIONS

This is a continuation application of International Application PCT/JP2010/051413, filed on Feb. 2, 2010; the entire contents of which are incorporated herein by reference.

FIELD

Embodiments described herein relate generally to an infrared imaging device and a method for manufacturing the same.

BACKGROUND

Infrared imaging devices have been developed based on MEMS (microelectromechanical systems) technology.

In an uncooled infrared imaging device capable of downsizing and on-chip implementation, in order to increase the infrared detection sensitivity, it is important to thermally isolate the infrared detecting section from the surroundings to increase the thermoelectric conversion efficiency.

For instance, Patent Document 1 (Japanese Patent No. 3715886) discloses a configuration of a thermal infrared solid-state imaging device. In this configuration, the infrared detecting section is supported by a support leg above a recess formed in a silicon substrate. To reduce the thermal conductivity of an interconnection layer on the support leg, the interconnection layer includes a material having high specific resistance. However, even if such a technique is used, the infrared detection sensitivity is insufficient, and there is room for improvement.

DETAILED DESCRIPTION

Figure 1:
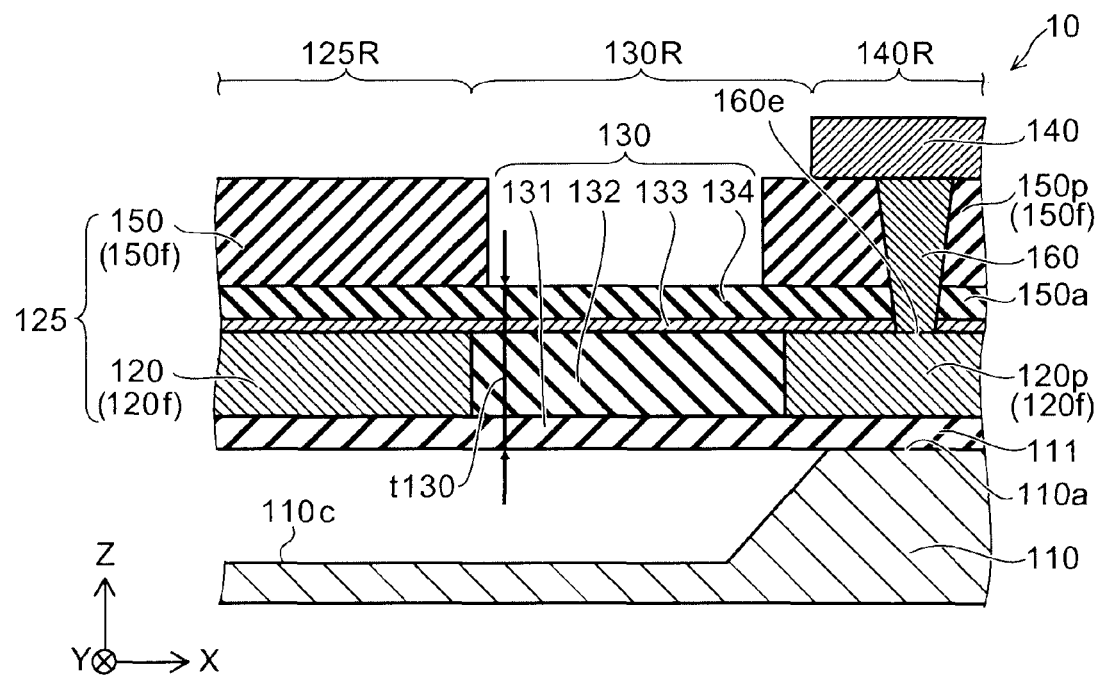
FIG. 1 is a schematic sectional view showing an infrared imaging device.

According to one embodiment, an infrared imaging device includes a substrate, a detecting section, an interconnection, a contact plug and a support beam. The substrate has a detection region, an interconnection region and support region provided between the detection region and the interconnection region. The substrate has a connection layer provided in the interconnection region. The detecting section is provided on the detection region. The detection section includes an infrared absorbing section and a thermoelectric converting section. The infrared absorbing section is provided above and spaced from the substrate and is configured to absorb infrared radiation. The thermoelectric converting section is provided between the infrared absorbing section and the substrate, spaced from the substrate, thermally connected to the infrared absorbing section, and configured to convert temperature change due to the infrared radiation absorbed in the infrared absorbing section to an electrical signal. The interconnection is provided on the interconnection region and configured to read the electrical signal. The contact plug extends from the interconnection toward the connection layer. The contact plug is electrically connected to the interconnection and the connection layer. The support beam is provided above the interconnection region. The support beam includes a support beam interconnection and supporting the detecting section above the substrate. One end of the support beam interconnection is connected to an end on a side of the substrate of the contact plug. Another end is connected to the thermoelectric converting section. The support beam interconnection is configured to transmit the electrical signal from the thermoelectric converting section via the contact plug to the interconnection.

According to one embodiment, a method is disclosed for manufacturing an infrared imaging device. The device includes a substrate, a detecting section, an interconnection, a contact plug and a support beam. The detecting section includes an infrared absorbing section and a thermoelectric converting section. The infrared absorbing section is provided above and spaced from the substrate and is configured to absorb infrared radiation. The thermoelectric converting section is provided between the infrared absorbing section and the substrate, is spaced from the substrate, is thermally connected to the infrared absorbing section, and is configured to convert temperature change due to the infrared radiation absorbed in the infrared absorbing section to an electrical signal. The interconnection is provided on an interconnection region of the substrate and is configured to read the electrical signal. The contact plug is electrically connected to the interconnection and is extending from the interconnection toward the substrate. The support beam includes a support beam interconnection and supports the detecting section above the substrate. One end of the support beam interconnection is connected to an end on a side of the substrate of the contact plug. Another end is connected to the thermoelectric converting section. The support beam interconnection is configured to transmit the electrical signal from the thermoelectric converting section via the contact plug to the interconnection. The method can include a first process configured to form a semiconductor layer constituting the thermoelectric converting section on the substrate. The method can include a second process configured to form a conductive film constituting the support beam interconnection on the semiconductor layer. The method can include a third process configured to form an infrared absorption layer constituting the infrared absorbing section on the conductive film. The method can include a fourth process configured to form a contact plug by forming a contact hole reaching the conductive film in an interconnection region which is a portion of the infrared absorption layer where the interconnection is to be located, and then embedding a conductive material in the contact hole. The method can include a fifth process configured to form the interconnection on the contact plug. The method can include a sixth process configured to form the detecting section and the support beam by processing the infrared absorption layer, the semiconductor layer, and the conductive film. In addition, the method can include a seventh process configured to space the thermoelectric converting section and the support beam from the substrate by removing a portion of the substrate facing the thermoelectric converting section and the support beam.

Various embodiments will be described hereinafter with reference to the accompanying drawings.

The drawings are schematic or conceptual. The relationship between the thickness and the width of each portion, and the size ratio between the portions, for instance, are not necessarily identical to those in reality. Furthermore, the same portion may be shown with different dimensions or ratios depending on the figures.

In the present specification and the drawings, components similar to those described previously with reference to earlier figures are labeled with like reference numerals, and the detailed description thereof is omitted appropriately.

(First Embodiment)

FIG. 1 is a schematic sectional view illustrating the configuration of an infrared imaging device according to a first embodiment.

Figure 2:
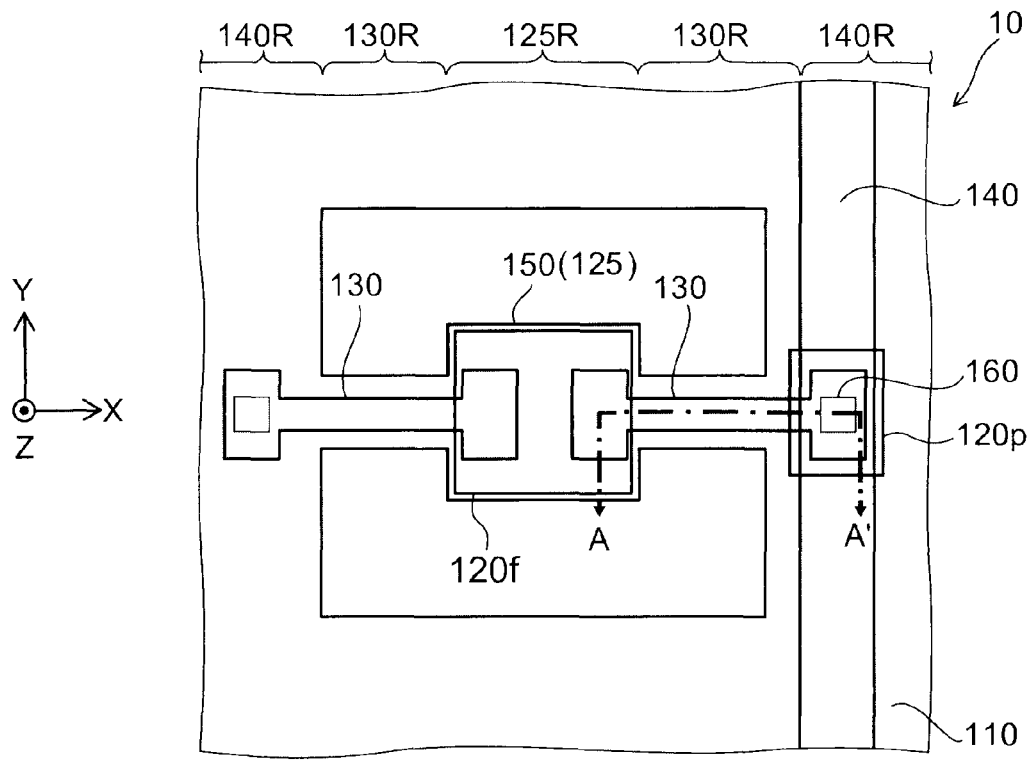
FIG. 2 is a schematic plan view showing the infrared imaging device.

FIG. 2 is a schematic plan view illustrating the configuration of the infrared imaging device according to the first embodiment.

That is, FIG. 1 is a sectional view taken along line A-A' of FIG. 2.

As shown in FIGS. 1 and 2, the infrared imaging device 10 according to the first embodiment includes a substrate 110, a detecting section 125, an interconnection 140, a contact plug 160, and a support beam 130 (support leg).

The detecting section 125 includes an infrared absorbing section 150 and a thermoelectric converting section 120.

The infrared absorbing section 150 is provided above and spaced from the substrate 110, and absorbs infrared radiation.

The thermoelectric converting section 120 is provided between the infrared absorbing section 150 and the substrate 110, spaced from the substrate 110, and thermally connected to the infrared absorbing section 150. The thermoelectric converting section 120 converts temperature change due to infrared radiation absorbed in the infrared absorbing section 150 to an electrical signal.

The interconnection 140 is provided above and spaced from the substrate 110, and transmits the electrical signal converted in the thermoelectric converting section 120. That is, the electrical signal converted in the thermoelectric converting section 120 is transmitted via the interconnection 140 toward e.g. the outside of the infrared imaging device 10.

The contact plug 160 is electrically connected to the interconnection 140 and extends from the interconnection 140 toward the substrate 110.

The support beam 130 includes a support beam interconnection 133 and supports the detecting section 125 above the substrate 110. More specifically, one end of the support beam 130 is connected to above the substrate 110 in the portion of the contact plug 160. The other end of the support beam 130 is connected to the detecting section 125. Thus, the support beam 130 supports the detecting section 125 above the substrate 110 with spacing from the substrate 110.

One end of the support beam interconnection 133 is connected to the end 160e on the substrate 110 side of the contact plug 160. The other end of the support beam interconnection 133 is connected to the thermoelectric converting section 120. The support beam interconnection 133 transmits an electrical signal from the thermoelectric converting section 120 via the contact plug 160 to the interconnection 140.

Here, the direction perpendicular to the major surface 110a of the substrate 110 is defined as Z-axis direction. One of the directions perpendicular to the Z-axis direction is defined as X-axis direction. The direction perpendicular to the Z-axis direction and the X-axis direction is defined as Y-axis direction.

The direction from the substrate 110 toward the detecting section 125 is referred to as "above" or "upward" for convenience. The upward side is referred to as "upper side", and the surface on the upper side is referred to as "upper surface". The direction from the detecting section 125 toward the substrate 110 is referred to as "below" or "downward" for convenience. The downward side is referred to as "lower side", and the surface on the lower side is referred to as "lower surface".

The support beam 130 extends in e.g. the X-Y plane.

In the specific example, in addition to the support beam interconnection 133, the support beam 130 further includes a support beam intermediate insulating layer 132 provided on the lower side of the support beam interconnection 133, a support beam lower side insulating layer 131 provided on the lower side of the support beam intermediate insulating layer 132, and a support beam covering layer 134 provided on the upper side of the support beam interconnection 133. The support beam lower side insulating layer 131, the support beam intermediate insulating layer 132, and the support beam covering layer 134 can be provided as necessary, and at least one of them may be omitted.

As shown in FIG. 2, in the specific example, one support beam 130 is provided on each of one end and the other end of the detecting section 125. The detecting section 125 is supported above the substrate at the two ends. The two ends can be made similar in structure. Hence, in the following, one of the two ends is described.

Here, on the substrate 110, the region provided with the detecting section 125 is referred to as a detection region 125R. The region provided with the interconnection 140 is referred to as an interconnection region 140R. The region between the detection region 125R and the interconnection region 140R is referred to as a support region 130R.

In the specific example, the substrate 110 is e.g. a silicon substrate.

As shown in FIG. 1, an insulating layer 111 is provided on the substrate 110. The thermoelectric converting section 120 is formed on the insulating layer 111. The insulating layer 111 is made of e.g. a silicon oxide film.

On the insulating layer 111, a semiconductor layer 120f constituting the thermoelectric converting section 120 is provided.

The thermoelectric converting section 120 can be based on e.g. a pn junction diode (e.g., silicon pn junction diode) serving as a thermoelectric conversion element. This can convert the thermal change to an electrical signal with low noise and high sensitivity. That is, the semiconductor layer 120f includes a semiconductor layer, and can include e.g. a pn junction diode. However, the embodiment is not limited thereto. The thermoelectric converting section 120 can also be based on e.g. a resistance element or transistor.

Here, one thermoelectric converting section 120 can include a plurality of thermoelectric conversion elements. For instance, one thermoelectric converting section 120 can include a plurality of pn junction diodes, which are connected to each other. One end of the plurality of connected pn junction diodes is connected to the support beam interconnection 133.

In the detection region 125R, the insulating layer 111 is provided on the lower side of the thermoelectric converting section 120. A void 110c is provided between the insulating layer 111 and the substrate 110. That is, a void 110c is provided between the detecting section 125 and the substrate 110.

In the interconnection region 140R, the insulating layer 111 is provided on the major surface 110a of the substrate 110. A lower pillar 120p made of the semiconductor layer 120f is provided on the insulating layer 111. The upper surface (the surface on the side opposite to the substrate 110) of the thermoelectric converting section 120 and the upper surface of the lower pillar 120p have the same height as viewed from the substrate 110.

The support beam interconnection 133 of the support beam 130 is provided on the upper surface of the thermoelectric converting section 120 and the upper surface of the lower pillar 120p.

The support beam lower side insulating layer 131 is formed from the insulating layer 111.

The support beam intermediate insulating layer 132 can be made of e.g. a silicon oxide film. More specifically, as described later, the support beam intermediate insulating layer 132 can be formed from a silicon oxide film embedded in a space formed by removal of part of the semiconductor layer 120f constituting the thermoelectric converting section 120.

In the specific example, the support beam covering layer 134 is provided on the support beam interconnection 133. The support beam covering layer 134 is formed from a covering layer 150a. The covering layer 150a extends in the detection region 125R and the interconnection region 140R. That is, the portion of the covering layer 150a in the support region 130R constitutes the support beam covering layer 134.

The support beam 130 supports the thermoelectric converting section 120 (detecting section 125) above the substrate 110 with spacing from the substrate 110. In this case, in order to minimize thermal conduction between the thermoelectric converting section 120 and the interconnection 140 (substrate 110) via the support beam 130, the support beam 130 is preferably made of a material having low thermal conductivity. Furthermore, the support beam 130 is preferably formed in a slimmer and longer arrangement within the acceptable range of design. Thus, the support beam 130 may be configured to have e.g. a meandering shape folded in the X-Y plane, or a spiral shape.

The support beam interconnection 133 can be made of e.g. Ti, Co, and Ni.

The covering layer 150a (support beam covering layer 134) can be made of e.g. a silicon oxide film. Alternatively, as described later, the covering layer 150a (support beam covering layer 134) can be made of e.g. a silicon nitride film functioning as an etching stopper film.

In the detection region 125R, the infrared absorbing section 150 is provided on the thermoelectric converting section 120 (on the side opposite to the substrate 110). In the specific example, the support beam interconnection 133 constituting part of the support beam 130 is provided on the thermoelectric converting section 120. The covering layer 150a is provided on the support beam interconnection 133. An infrared absorption layer 150f constituting the infrared absorbing section 150 is provided on the covering layer 150a.

The infrared absorption layer 150f (infrared absorbing section 150) is made of e.g. a silicon oxide film or silicon nitride film. However, the embodiment is not limited thereto. The infrared absorption layer 150f (infrared absorbing section 150) can be made of an arbitrary material absorbing infrared radiation.

In the interconnection region 140R, one end of the support beam interconnection 133 is connected onto the lower pillar 120p made of the semiconductor layer 120f. The covering layer 150a is provided on the support beam interconnection 133. An upper pillar 150p made of the infrared absorption layer 150f is provided on the covering layer 150a. The interconnection 140 is provided on the upper pillar 150p.

Furthermore, in the interconnection region 140R, the contact plug 160 is provided. The contact plug 160 penetrates along the Z-axis direction through the upper pillar 150p and the covering layer 150a, and electrically connects the interconnection 140 and the support beam interconnection 133.

More specifically, for instance, a through hole penetrating along the Z-axis direction through the upper pillar 150p and the covering layer 150a is provided. A conductive material is embedded inside the through hole. Thus, a contact plug 160 electrically connected to the support beam interconnection 133 on the lower side of the through hole is formed. Furthermore, an interconnection 140 is formed on the contact plug 160. Thus, the thermoelectric converting section 120 and the interconnection 140 are electrically connected via the support beam interconnection 133 and the contact plug 160.

As described above, the thermoelectric converting section 120 is thermally connected to the infrared absorbing section 150. In the specific example, in the detection region 125R, the support beam interconnection 133 is provided between the thermoelectric converting section 120 and the infrared absorbing section 150. However, the thickness of the support beam interconnection 133 is thin. Hence, the thermoelectric converting section 120 and the infrared absorbing section 150 can be regarded as being thermally connected. Furthermore, in the specific example, in the detection region 125R, the covering layer 150a is provided between the support beam interconnection 133 and the infrared absorbing section 150.

However, the thickness of this covering layer 150a is thin. Hence, the thermoelectric converting section 120 and the infrared absorbing section 150 can be regarded as being thermally connected.

Furthermore, as described above, the infrared absorbing section 150 can be made of e.g. a silicon oxide film or silicon nitride film having the property of absorbing infrared radiation. Likewise, the covering layer 150a can also be made of e.g. a silicon oxide film or silicon nitride film. Thus, in the case where the covering layer 150a is made of a material absorbing infrared radiation, the covering layer 150a in the detection region 125R may be regarded as part of the infrared absorbing section 150.

Thus, the infrared absorbing section 150 and the thermoelectric converting section 120 are provided in thermal contact with each other.

On the other hand, the detecting section 125 including the infrared absorbing section 150 and the thermoelectric converting section 120, and the support beam 130 are spaced from the substrate 110. This reduces thermal conduction to the substrate 110.

An infrared detection element constituting one pixel of the infrared imaging device 10 includes the detecting section 125 including the infrared absorbing section 150 and the thermoelectric converting section 120, and the support beam 130.

A plurality of infrared detection elements, each constituting one pixel, are provided in e.g. a matrix configuration to form an infrared imaging region. Between the pixels, the interconnection 140 is provided in a lattice configuration. The output of the thermoelectric converting section 120 in each pixel is extracted via the support beam 130 and the interconnection 140 to the outside of the infrared imaging region. Hence, the intensity of infrared radiation detected in each pixel is outputted. Thus, the interconnection 140 is provided between each pair of a plurality of detecting sections 125.

In the infrared imaging device 10 according to the embodiment, the contact plug 160 extends from the interconnection 140 toward the substrate 110. One end of the support beam interconnection 133 is connected to the end 160e on the substrate 110 side of the contact plug 160. The other end of the support beam interconnection 133 is connected to the thermoelectric converting section 120. The support beam interconnection 133 extends in the X-Y plane (in the plane perpendicular to the direction from the substrate 110 toward the detecting section 125) at the height (height as viewed from the substrate 110) of the end 160e on the substrate 110 side of the contact plug 160.

In the support region 130R of such an infrared imaging device 10, on the upper surface of the support beam interconnection 133, only the support beam covering layer 134 made of the relatively thin covering layer 150a is provided. Thus, the thickness t130 (length along the Z-axis direction) of the support beam 130 is relatively thin.

This can reduce the cross-sectional area of the support beam 130 (cross-sectional area of the support beam 130 cut along the plane perpendicular to the extending direction of the support beam 130) significantly affecting the thermal conduction from the detecting section 125. Thus, thermal insulation of the detecting section 125 can be improved. The infrared imaging device 10 according to the embodiment can provide an infrared imaging device having high sensitivity.

COMPARATIVE EXAMPLE

Figure 3:
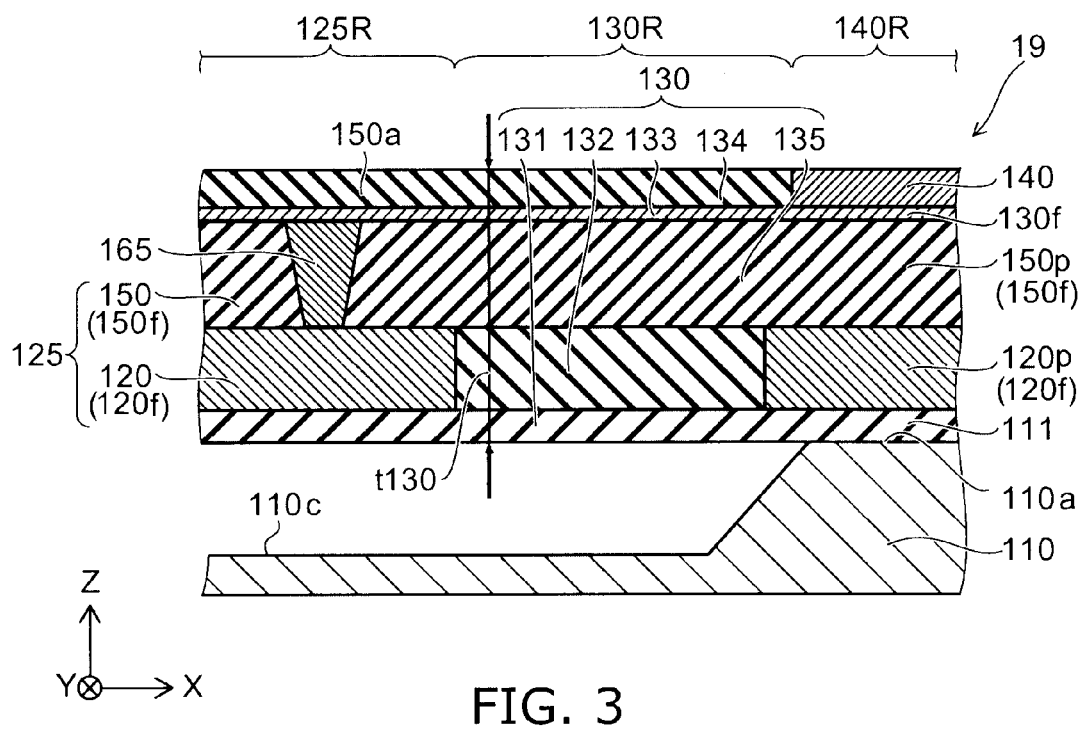
FIG. 3 is a schematic sectional view showing an infrared imaging device of a comparative example.

FIG. 3 is a schematic sectional view illustrating the configuration of an infrared imaging device of a comparative example.

That is, this figure is a sectional view corresponding to the cross section taken along line A-A' of FIG. 2.

As shown in FIG. 3, in the infrared imaging device 19 of the comparative example, in the interconnection region 140R, an insulating layer 111 is provided on the substrate 110. A lower pillar 120p made of a semiconductor layer 120f is provided on the insulating layer 111. An upper pillar 150p made of an infrared absorption layer 150f is provided on the lower pillar 120p. One end of the support beam interconnection 133 is connected onto the upper pillar 150p. An interconnection 140 is provided on one end of the support beam interconnection 133.

The support beam interconnection 133 extends in the interconnection region 140R, the support region 130R, and the detection region 125R. In the support region 130R and the detection region 125R, a covering layer 150a is provided on the support beam interconnection 133. The covering layer 150a in the support region 130R constitutes a support beam covering layer 134.

In the detection region 125R, the insulating layer 111 is provided above and spaced from the substrate 110. A thermoelectric converting section 120 is provided on the insulating layer 111. An infrared absorbing section 150 is provided on the thermoelectric converting section 120. The support beam interconnection 133 is provided on the infrared absorbing section 150. The covering layer 150a is provided on the support beam interconnection 133.

A detection region connecting section 165 for connecting the thermoelectric converting section 120 and the support beam interconnection 133 is provided so as to penetrate through the infrared absorbing section 150. The detection region connecting section 165 electrically connects the support beam interconnection 133 and the thermoelectric converting section 120.

In the support region 130R, the insulating layer 111 is provided above and spaced from the substrate 110. The semiconductor layer 120f is provided on the insulating layer 111. The infrared absorption layer 150f is provided on the semiconductor layer 120f. The support beam interconnection 133 is provided on the infrared absorption layer 150f. The covering layer 150a is provided on the support beam interconnection 133. In the support region 130R, the insulating layer 111 constitutes a support beam lower side insulating layer 131. The semiconductor layer 120f constitutes a support beam intermediate insulating layer 132. The infrared absorption layer 150f constitutes a support beam upper side insulating layer 135. The covering layer 150a constitutes a support beam covering layer 134.

Thus, in the infrared imaging device 19 of the comparative example, the support beam 130 includes a support beam lower side insulating layer 131, a support beam intermediate insulating layer 132, a support beam upper side insulating layer 135, a support beam interconnection 133, and a support beam covering layer 134. Compared with the infrared imaging device 10 according to the embodiment, the number of layers included in the support beam 130 is larger by the amount of the support beam upper side insulating layer 135.

The infrared imaging device 19 of the comparative example corresponds to the configuration described in e.g. Patent Document 1. More specifically, in the infrared imaging device 19, a detecting section 125 (including the infrared absorbing section 150 and the thermoelectric converting section 120) is supported by the support beam 130 above a void 110c provided in the substrate 110. The support beam 130 is provided with the support beam interconnection 133 electrically connecting the thermoelectric converting section 120 and the substrate 110 (interconnection 140). A contact layer (detection region connecting section 165) is provided between the support beam interconnection 133 and the substrate 110.

This detection region connecting section 165 extends upward from the thermoelectric converting section 120 and is connected to the support beam interconnection 133. The support beam interconnection 133 extends in the X-Y plane and is connected to the interconnection 140.

That is, in the infrared imaging device 19 of the comparative example, the contact layer (detection region connecting section 165) is provided in the detection region 125R. The contact layer electrically connects the interconnection 140 and the thermoelectric converting section 120 provided above the substrate 110 and extends in the Z-axis direction. The support beam interconnection 133 is connected to the upper side of this contact layer.

Thus, in the infrared imaging device 19, the support beam upper side insulating layer 135 made of a layer (infrared absorption layer 150f) penetrated by the contact layer (detection region connecting section 165) is provided below the support beam interconnection 133. Hence, the thickness t130 of the support beam 130 is thick.

In contrast, in the infrared imaging device 10 according to the embodiment, the contact layer (contact plug 160) is provided in the interconnection region 140R. The contact layer electrically connects the interconnection 140 and the thermoelectric converting section 120 provided above the substrate 110 and extends in the Z-axis direction. Furthermore, the support beam interconnection 133 is connected to the lower side of this contact layer (contact plug 160). Thus, the layer penetrated by the contact layer (contact plug 160) is located above the support beam interconnection 133. This layer is removable, and is not included in the support beam 130. Thus, the thickness t130 of the support beam 130 can be thinned.

In the infrared imaging device 10 according to the embodiment, the support beam interconnection 133 can be made of e.g. a material having higher resistance than the interconnection 140. That is, the specific resistance of the support beam interconnection 133 can be set higher than that of the interconnection 140. Thus, the thermal conductivity of the support beam interconnection 133 can be made lower. On the other hand, the interconnection 140 can be made of a material having low resistance. Thus, the electrical signal can be efficiently transmitted, and the sensitivity of the infrared imaging device can be improved.

Preferably, the material of the first intermediate layer (in the specific example, the lower pillar 120p) between the support beam interconnection 133 and the substrate 110 in the interconnection region 140R, and the material of the second intermediate layer (in the specific example, the thermoelectric converting section 120) between the support beam interconnection 133 and the substrate 110 in the detection region 125R, are substantially identical to each other. In the specific example, the lower pillar 120p is made of the semiconductor layer 120f, and the thermoelectric converting section 120 is made of the semiconductor layer 120f. Thus, their materials are identical. Furthermore, the support beam 130 includes a support beam intermediate insulating layer 132 provided between the lower pillar 120p and the thermoelectric converting section 120. The support beam intermediate insulating layer 132 fills the gap between the lower pillar 120p and the thermoelectric converting section 120. Furthermore, the support beam intermediate insulating layer 132 insulates the lower pillar 120p and the thermoelectric converting section 120 from each other. In conjunction with the lower pillar 120p and the thermoelectric converting section 120, the support beam intermediate insulating layer 132 constitutes a flat plane for forming the support beam interconnection 133. This stabilizes the formation of the support beam interconnection 133, improves the reliability, and improves the yield and other productivity.

FIRST PRACTICAL EXAMPLE

In the following, a method for manufacturing an infrared imaging device of a first practical example according to the embodiment is described.

FIGS. 4 to 13 are sequential schematic sectional views illustrating the method for manufacturing an infrared imaging device according to the first practical example.

Figure 4:
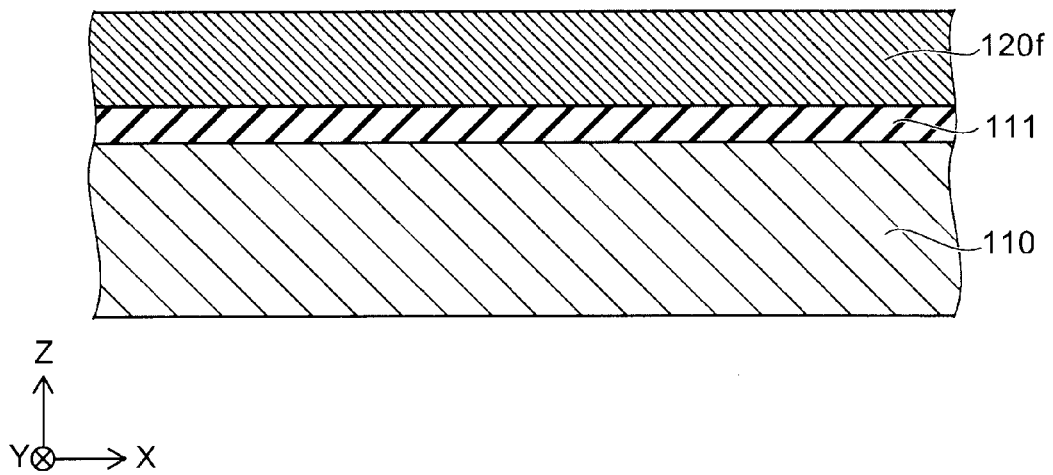
FIG. 4 is a sequential schematic sectional view showing a method for manufacturing an infrared imaging device.

As shown in FIG. 4, first, on a substrate 110, an insulating layer 111 is formed. Then, a semiconductor layer 120f is formed on the insulating layer 111. The substrate 110 is e.g. a single crystal silicon substrate. The insulating layer 111 is made of e.g. an embedded silicon oxide film. The semiconductor layer 120f is e.g. a single crystal silicon layer. That is, an SOI (semiconductor on insulator) substrate is formed.

Figure 5:
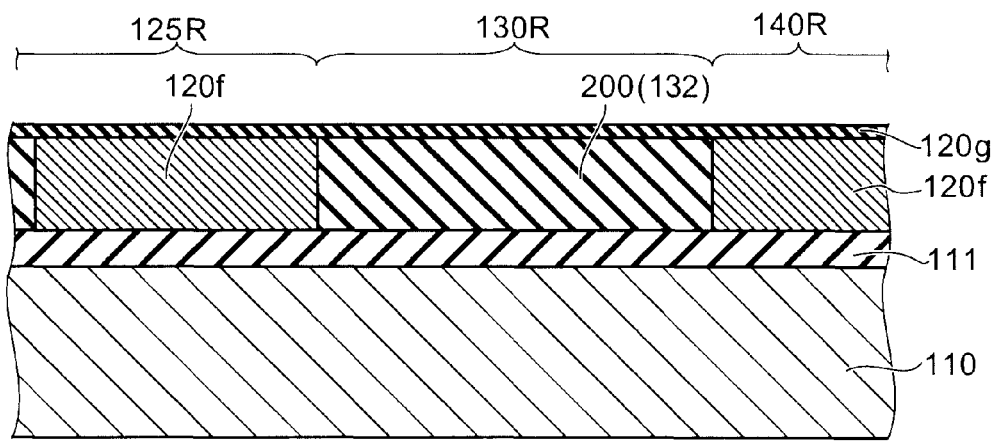
FIG. 5 is a sequential schematic sectional view showing a method for manufacturing an infrared imaging device.

As shown in FIG. 5, the portion of the semiconductor layer 120f corresponding to the support region 130R is removed by the photolithography technique and etching technique. A device isolation layer 200 is embedded in the space formed by the removal of the semiconductor layer 120f. The device isolation layer 200 constitutes a support beam intermediate insulating layer 132 later. The etching can be based on e.g. RIE (reactive ion etching). The device isolation layer 200 can be made of e.g. a silicon oxide film. For instance, in the space formed by the removal of the semiconductor layer 120f, a silicon oxide film is embedded by CVD (chemical vapor deposition) and planarized by CMP (chemical mechanical polishing) to form a device isolation layer 200.

The silicon oxide film used for this device isolation layer 200 is also used as a device isolation layer for isolation between the inside and outside of the infrared imaging region, and a device isolation layer for isolation between a plurality of pixels (infrared detection elements).

Subsequently, an insulating layer 120g is formed on the surface portion of the semiconductor layer 120f. This insulating layer 120g may be formed by oxidizing the surface portion of the semiconductor layer 120f, or by separately providing a silicon oxide film on the semiconductor layer 120f and the device isolation layer 200.

Figure 6:
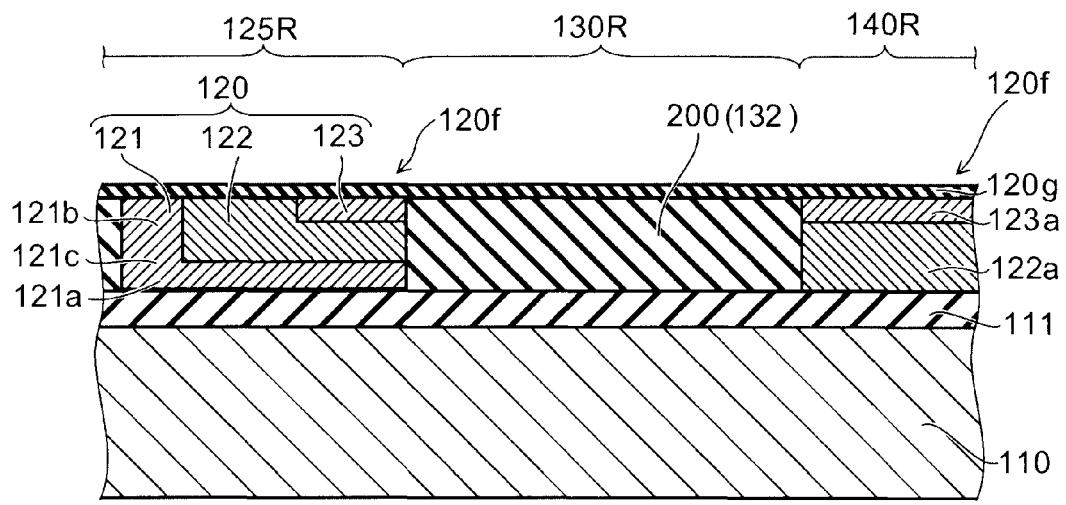
FIG. 6 is a sequential schematic sectional view showing a method for manufacturing an infrared imaging device.

Next, as shown in FIG. 6, a pn junction diode constituting a thermoelectric converting section 120 is formed. For instance, in the semiconductor layer 120f of the detection region 125R, by the photolithography technique and ion implantation, a $p^+$-diffusion layer region 121, a $p^-$-region 122, and an $n^+$-diffusion layer region 123 (diffusion layer) are formed.

For instance, the region of the $n^+$-diffusion layer region 123 is defined by the photolithography technique, and the $n^+$-diffusion layer region 123 is formed by ion implantation.

Next, in the deep region of the semiconductor layer 120f, a $p^+$-electrode region 121a constituting part of the $p^+$-diffusion layer region 121 is formed. In the shallow region (surface) of the semiconductor layer 120f, a $p^+$-contact diffusion layer region 121b constituting another part of the $p^+$-diffusion layer region 121 is formed. The $p^+$-contact diffusion layer region 121b is spaced from the $n^+$-diffusion layer region 123 in the shallow region (surface) of the semiconductor layer 120f. Between the $p^+$-contact diffusion layer region 121b and the $p^+$-electrode region 121a, a $p^+$-diffusion layer intermediate region 121c for connecting them is formed.

A $p^-$-region 122 is formed between the $p^+$-diffusion layer region 121 and the $n^+$-diffusion layer region 123.

When the n$^+$-diffusion layer region 123 is formed, in the interconnection region 140R, an n$^+$-diffusion layer 123a is formed in the surface portion of the semiconductor layer 120f. Furthermore, in the interconnection region 140R, a p$^-$-diffusion layer 122a is formed in the deep region of the semiconductor layer 120f.

Subsequently, in the interconnection region 140R, the support region 130R, and the detection region 125R, the insulating layer 120g is removed.

Figure 7:
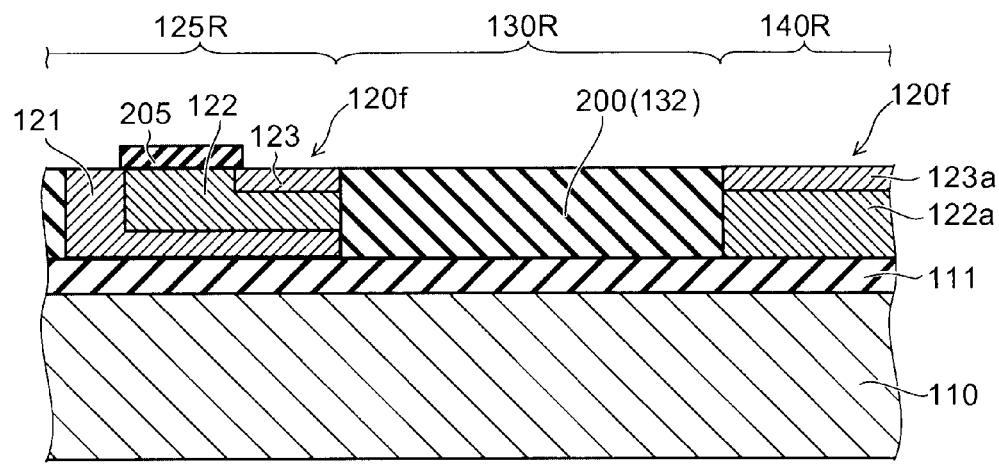
FIG. 7 is a sequential schematic sectional view showing a method for manufacturing an infrared imaging device.

Next, as shown in FIG. 7, on the surface of the semiconductor layer 120f, a block film 205 is formed so as to cover the portion from the end portion on the n$^+$-diffusion layer region 123 side of the p$^+$-diffusion layer region 121 to the end portion on the p$^+$-diffusion layer region 121 side of the n$^+$-diffusion layer region 123. The block film 205 can be made of e.g. a silicon oxide film. For instance, a silicon oxide film is formed by the CVD method on the entire surface including the surface of the semiconductor layer 120f. Then, by photolithography and RIE, this silicon oxide film is patterned into a block film 205. As the case may be, instead of removing the aforementioned insulating layer 120g, the insulating layer 120g can be processed into a prescribed shape to form a block film 205.

The block film 205 has a blocking function for avoiding electrical continuation between the n$^+$-diffusion layer region 123 and the p$^+$-diffusion layer region 121 in the silicidation process described later.

Figure 8:
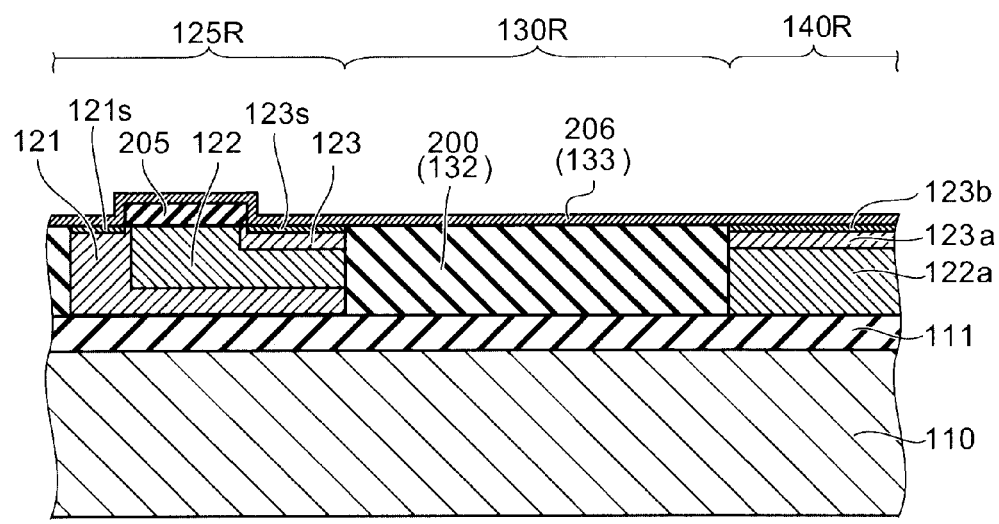
FIG. 8 is a sequential schematic sectional view showing a method for manufacturing an infrared imaging device.

Next, as shown in FIG. 8, a conductive film 206 constituting a support beam interconnection 133 is formed by e.g. the sputtering method. The conductive film 206 can be made of e.g. a Ti film. The conductive film 206 has a thickness of e.g. approximately 50 nm (nanometers). Subsequently, for instance, by annealing in a nitrogen atmosphere at 650° C., a detection region silicide film 123s is formed in the portion on the conductive film 206 side of the n$^+$-diffusion layer region 123, and a p-side silicide film 121s is formed in the portion on the conductive film 206 side of the p$^+$-diffusion layer region 121. In the specific example, the detection region silicide film 123s and the p-side silicide film 121s are TiSi films.

On the surface of the semiconductor layer 120f, the region between the n$^+$-diffusion layer region 123 and the p$^+$-diffusion layer region 121 is covered with the block film 205. Hence, no silicide film is formed in the region between the n$^+$-diffusion layer region 123 and the p$^+$-diffusion layer region 121. Thus, no electrical continuation occurs between the n$^+$-diffusion layer region 123 and the p$^+$-diffusion layer region 121.

On the other hand, in the interconnection region 140R, an interconnection region silicide film 123b is formed in the portion on the conductive film 206 side of the n$^+$-diffusion layer 123a.

Here, the conductive film 206 can also be made of Co and Ni. Thus, the conductive film 206 can be made of an arbitrary material capable of forming silicide.

In the practical example, the layer on the substrate 110 side of the support beam interconnection 133 in the interconnection region 140R is a silicide film (interconnection region silicide film 123b). Furthermore, the layer on the substrate 110 side of the support beam interconnection 133 in the detection region 125R is also a silicide film (detection region silicide film 123s and p-side silicide film 121s). This enables low resistance connection between the support beam interconnection 133 and the thermoelectric converting section 120, and low resistance connection between the support beam interconnection 133 on one hand and the lower pillar 120p and the contact plug 160 on the other.

Figure 9:
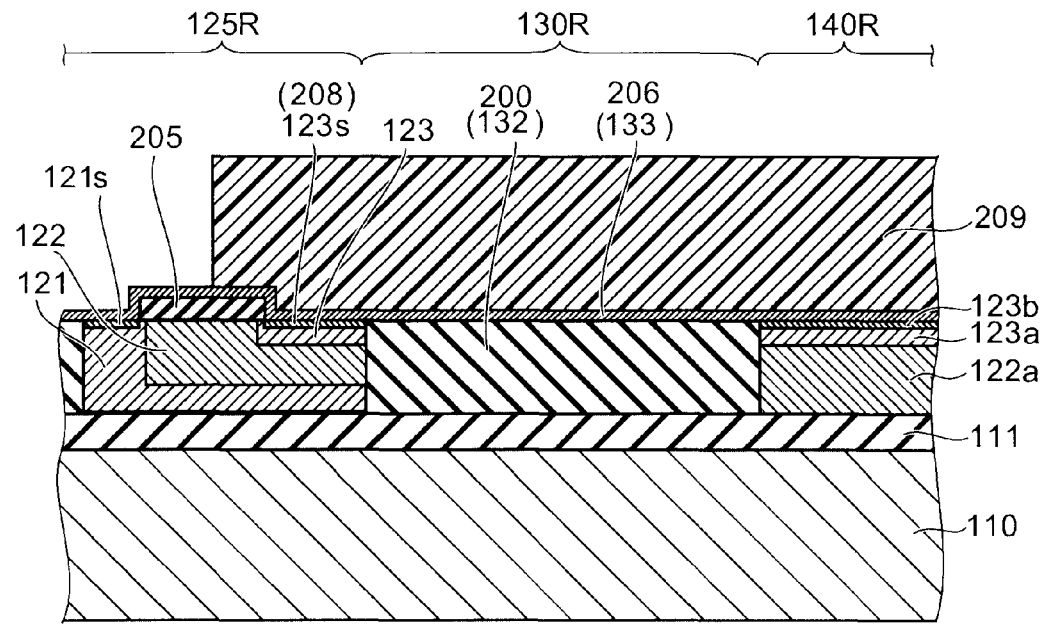
FIG. 9 is a sequential schematic sectional view showing a method for manufacturing an infrared imaging device.

Next, as shown in FIG. 9, a resist layer 209 is formed so as to cover the portion of the detection region 125R constituting an electrode, and the interconnection region 140R and the support region 130R.

The portion of the detection region 125R constituting an electrode is the portion constituting an electrode 208 of the thermoelectric converting section 120. In the specific example, the portion constituting the electrode 208 of the thermoelectric converting section 120 is the n$^+$-diffusion layer region 123. Hence, the resist layer 209 covers part of the block film 205 on the n$^+$-diffusion layer region 123 side and the n$^+$-diffusion layer region 123, besides the interconnection region 140R and the support region 130R.

The portion of the detection region 125R constituting the electrode (the electrode 208 of the thermoelectric converting section 120) can be one of the n$^+$-diffusion layer region 123 and the p$^+$-diffusion layer region 121 depending on e.g. the configuration of the arrangement of the pn junction diode in the thermoelectric converting section 120. For instance, in the case where the p$^+$-diffusion layer region 121 is used as the electrode 208 of the thermoelectric converting section 120, the resist layer 209 covers part of the block film 205 on the p$^+$-diffusion layer region 121 side and the p$^+$-diffusion layer region 121, besides the interconnection region 140R and the support region 130R.

Then, the resist layer 209 is used as a mask to etch the conductive film 206. Thus, the portion of the conductive film 206 not covered with the resist layer 209 is removed. This etching can be based on e.g. wet etching with a liquid mixture of ammonia and hydrogen peroxide. Subsequently, the resist layer 209 is stripped.

In this process, the pattern shape (shape in the X-Y plane) of the resist layer 209 in the support region 130R can be configured to correspond to e.g. the shape of the support beam 130. As described later, the pattern shape of the resist layer 209 in the support region 130R may be configured in e.g. a shape entirely covering the support region 130R. In this case, for instance, the support beam 130 is collectively processed in a deep RIE processing step later.

Figure 10:
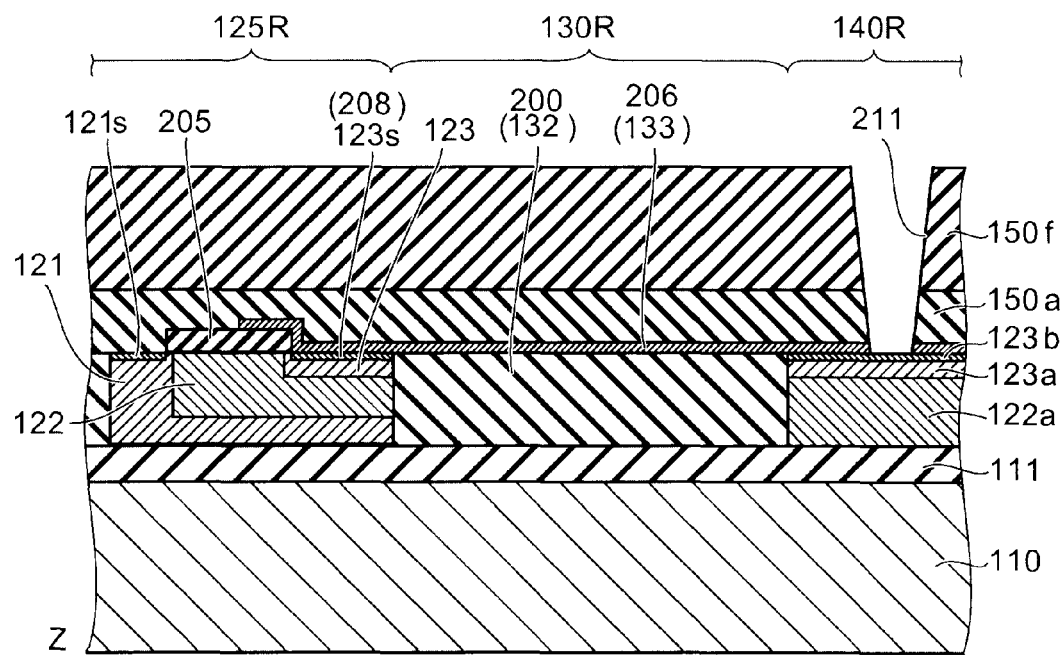
FIG. 10 is a sequential schematic sectional view showing a method for manufacturing an infrared imaging device.

Next, as shown in FIG. 10, by using the CVD method, a silicon oxide film constituting a covering layer 150a is formed. Furthermore, on the covering layer 150a, a stacked film of a silicon oxide film and a silicon nitride film constituting an infrared absorption layer 150f is formed. Then, in the interconnection region 140R, a contact hole 211 extending from the upper surface of the infrared absorption layer 150f to the support beam interconnection 133 is formed.

In the contact hole etching, typically, overetching is performed in view of the manufacturing margin. Because the film thickness of the support beam interconnection 133 is thin, there is concern that the contact hole 211 penetrates through the support beam interconnection 133 and increases the contact resistance. However, in the practical example, the interconnection region silicide film 123b is formed. Hence, the contact hole etching stops on the interconnection region silicide film 123b. Thus, by employing the structure using the n$^+$-diffusion layer 123a and the interconnection region silicide film 123b, the increase of contact resistance can be suppressed.

Figure 11:
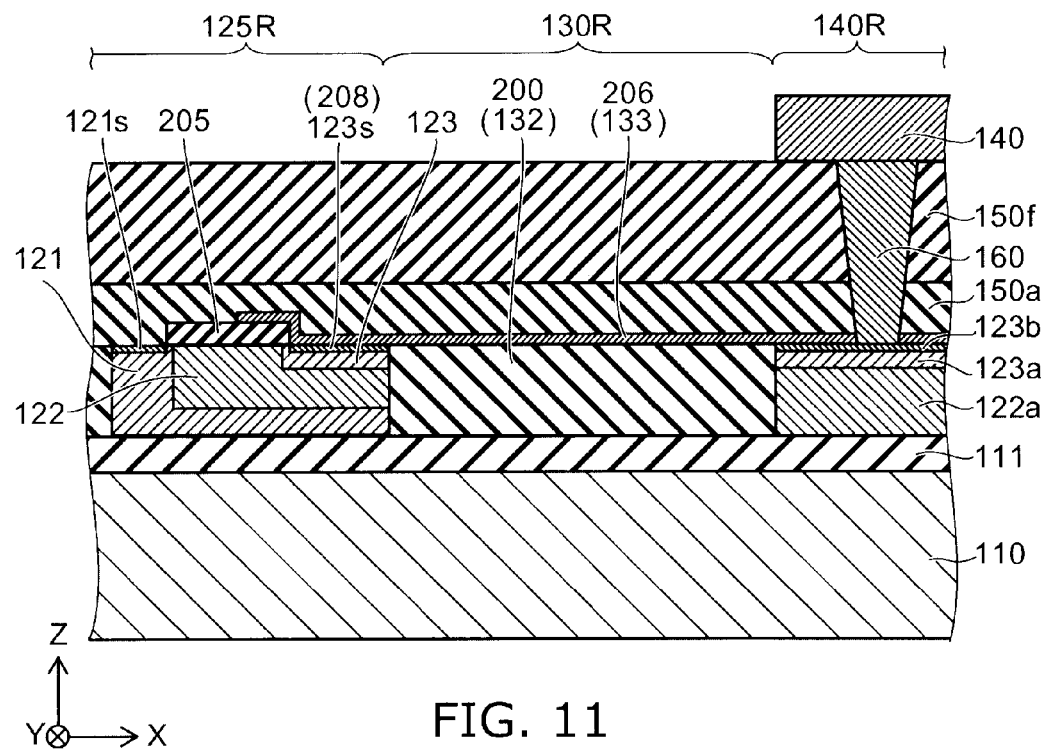
FIG. 11 is a sequential schematic sectional view showing a method for manufacturing an infrared imaging device.

Next, as shown in FIG. 11, a conductive layer is embedded in the contact hole 211 by e.g. the sputtering method and planarized by e.g. CMP to form a contact plug 160. Subsequently, an aluminum alloy, for instance, constituting an interconnection 140 is deposited by the sputtering method and patterned into an interconnection 140.

Figure 12:
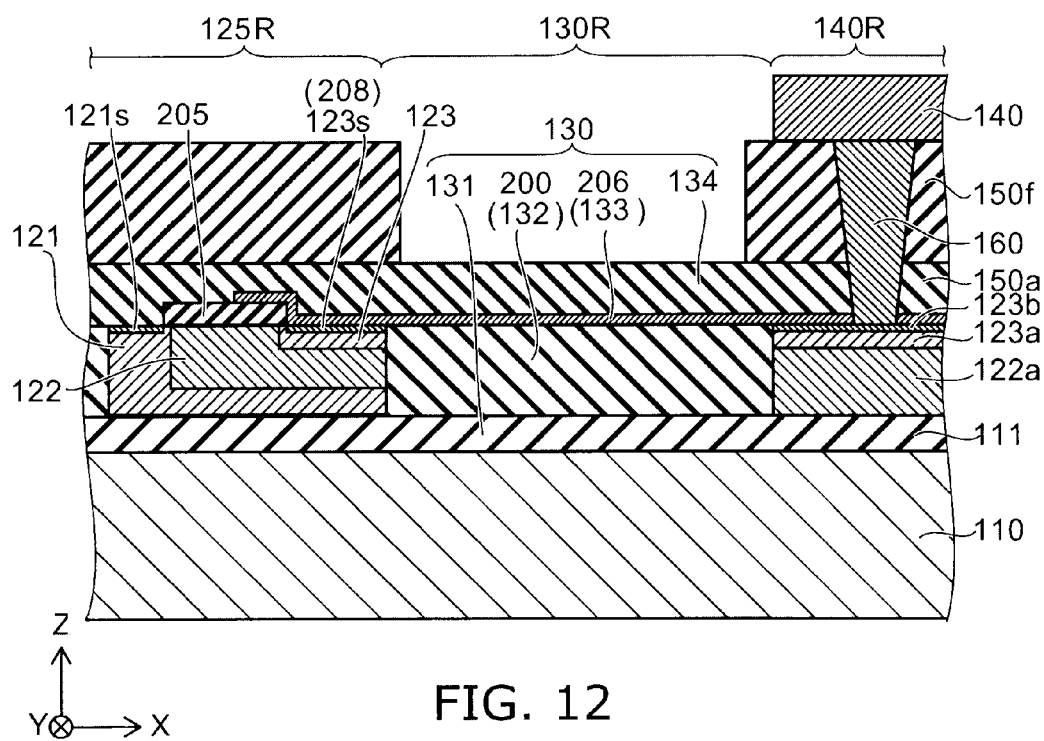
FIG. 12 is a sequential schematic sectional view showing a method for manufacturing an infrared imaging device.

Next, as shown in FIG. 12, by photolithography and etching, the infrared absorption layer 150f in the support region 130R is removed to reduce the cross section of the support beam 130.

Then, a through hole (not shown) penetrating to the major surface 110a of the substrate 110 is formed.

Figure 13:
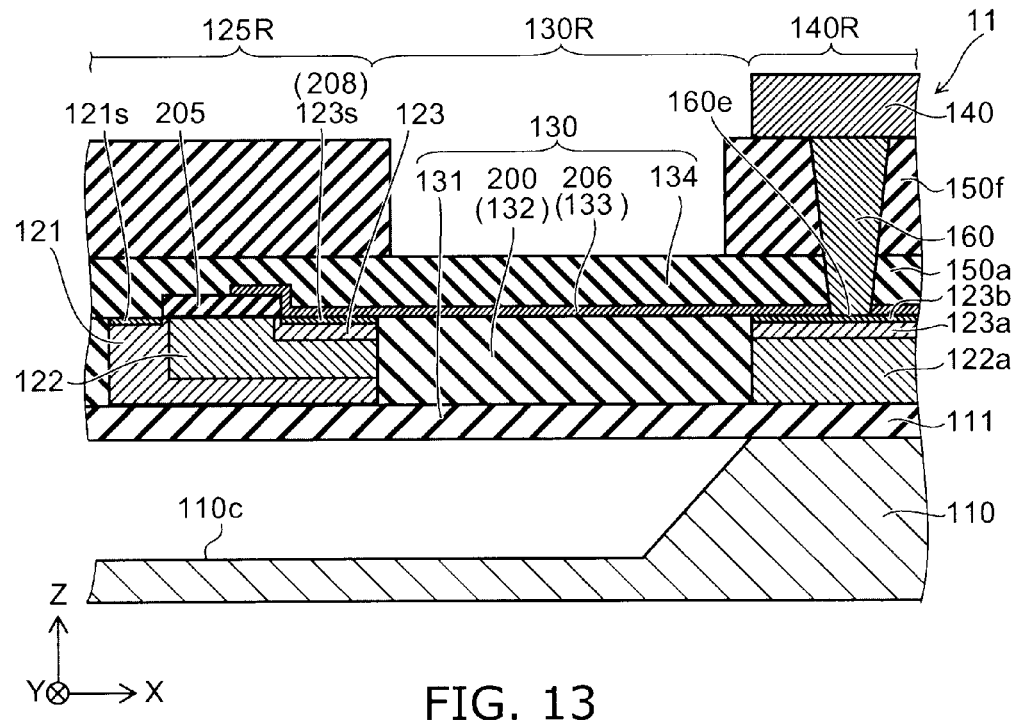
FIG. 13 is a sequential schematic sectional view showing a method for manufacturing an infrared imaging device.

Then, as shown in FIG. 13, the surface portion of the substrate 110 is etched via the through hole to form a void 110c between the support beam 130 and the thermoelectric converting section 120 on one hand and the substrate 110 on the other. This etching can be based on e.g. anisotropic wet etching with TMAH (tetramethylammonium hydroxide).

By the foregoing process, an infrared imaging device 11 according to the first practical example is formed.

The infrared imaging device 11 according to the practical example can reduce the cross-sectional area of the support beam interconnection 133 governing the thermal conduction from the detecting section 125 to improve thermal insulation of the detecting section 125. Thus, the practical example can provide an infrared solid-state imaging device having high sensitivity.

(Second Embodiment)

Figure 14:
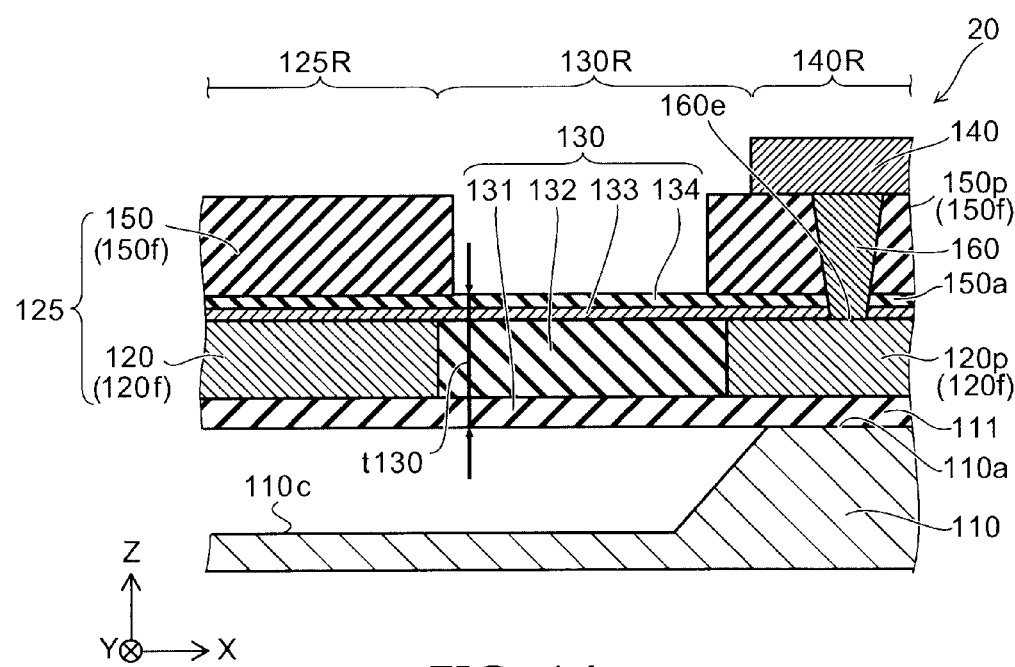
FIG. 14 is a schematic sectional view showing an infrared imaging device.

FIG. 14 is a schematic sectional view illustrating the configuration of an infrared imaging device according to a second embodiment.

As shown in FIG. 14, in the infrared imaging device 20 according to the embodiment, the support beam covering layer 134 provided on the upper surface of the support beam interconnection 133 in the support region 130R functions as an etching stopper film for the support beam interconnection 133. The remaining configuration is similar to that of the infrared imaging device 10 according to the first embodiment, and hence the description thereof is omitted.

In the infrared imaging device 20, for instance, the support beam interconnection 133 is made of a Ti film, and the support beam covering layer 134 (i.e., covering layer 150a) is made of a silicon nitride film.

This support beam covering layer 134 made of a silicon nitride film serves as an etching stopper film in etching e.g. the infrared absorption layer 150f.

More specifically, in the infrared imaging device 20 according to the embodiment, the support beam 130 further includes an etching stopper film (support beam covering layer 134) stacked on the support beam interconnection 133 on the upper side (on the side opposite to the substrate 110) of the support beam interconnection 133. The etching rate of the etching stopper film by the etchant for etching the layer (infrared absorption layer 150f) constituting the infrared absorbing section 150 is lower than that of the support beam interconnection 133.

Thus, an etching stopper film is provided on the support beam interconnection 133. Hence, when the layer (e.g., the infrared absorption layer 150f constituting the infrared absorbing section 150) on the upper side of the support beam interconnection 133 is etched back to reduce the thickness t130 of the support beam 130, the progress of this etch-back can be accurately stopped by the etching stopper film. Thus, the thickness t130 of the support beam 130 can be made uniform. That is, the cross-sectional shape of the support beam 130 can be made uniform. This can suppress the sensitivity variation of pixels.

Furthermore, as described later, the configuration of the support beam covering layer 134 can also be optimally controlled so that the film stress in the support beam 130 is canceled in the vertical direction (Z-axis direction).

That is, the accuracy of etching of the layer on the support beam interconnection 133 performed to improve the sensor sensitivity can be improved. Thus, an infrared solid-state imaging device with high sensitivity can be stably manufactured.

SECOND PRACTICAL EXAMPLE

In the following, a method for manufacturing an infrared imaging device of a second practical example according to the embodiment is described. In the second practical example, the process of FIGS. 4 to 9 described with reference to the first practical example can be made similar to that of the first practical example. Hence, the process subsequent thereto is described.

FIGS. 15 to 18 are sequential schematic sectional views illustrating the method for manufacturing an infrared imaging device according to the second practical example.

Figure 15:
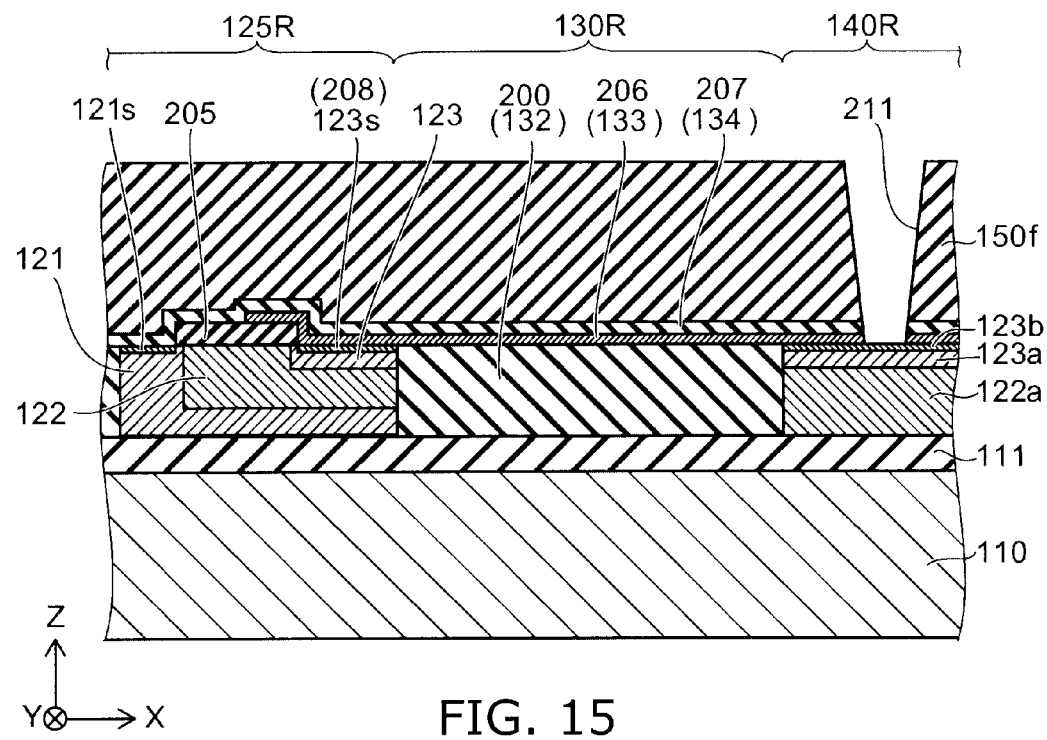
FIG. 15 is a sequential schematic sectional view showing a method for manufacturing an infrared imaging device.

As shown in FIG. 15, after the process described with reference to FIG. 9, the resist layer 209 is stripped. Subsequently, on the conductive film 206 constituting the support beam interconnection 133, a silicon nitride film 207 constituting a covering layer 150a functioning as an etching stopper film is formed.

Subsequently, on the silicon nitride film 207, a stacked film of a silicon oxide film and a silicon nitride film constituting an infrared absorption layer 150f is formed. Then, in the interconnection region 140R, a contact hole 211 extending from the upper surface of the infrared absorption layer 150f to the support beam interconnection 133 is formed.

Figure 16:
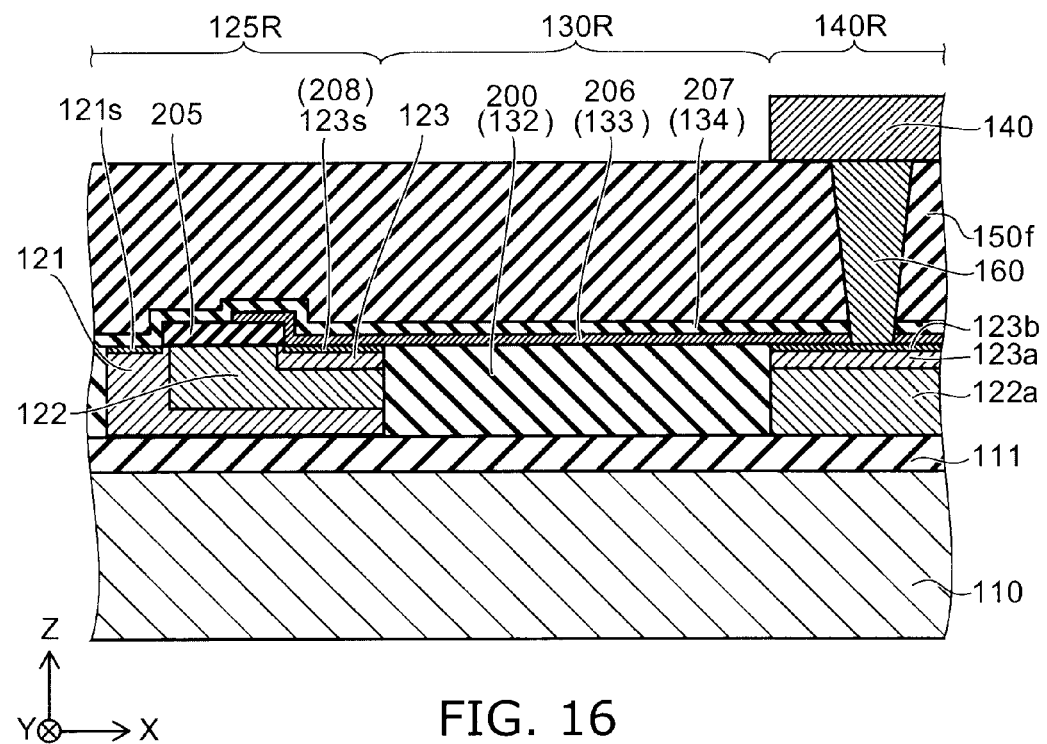
FIG. 16 is a sequential schematic sectional view showing a method for manufacturing an infrared imaging device.

Next, as shown in FIG. 16, a conductive layer is embedded in the contact hole 211 and planarized by CMP to form a contact plug 160. Subsequently, an interconnection 140 made of e.g. an aluminum alloy is formed.

Figure 17:
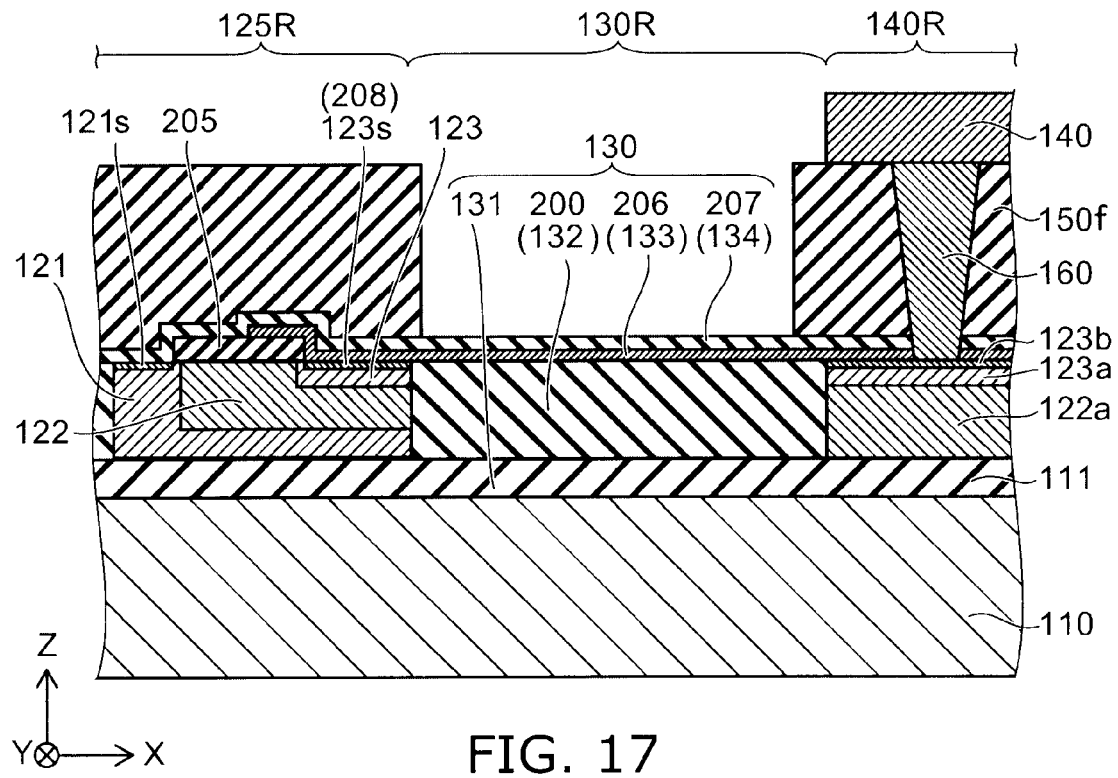
FIG. 17 is a sequential schematic sectional view showing a method for manufacturing an infrared imaging device.

Next, as shown in FIG. 17, by photolithography and etching, the infrared absorption layer 150f in the support region 130R is removed to reduce the cross section of the support beam 130. In this etching of the infrared absorption layer 150f made of a silicon oxide film, the silicon nitride film 207 functions as an etching stopper, and the etching is controlled with high accuracy.

Then, a through hole (not shown) penetrating to the major surface 110a of the substrate 110 is formed.

Figure 18:
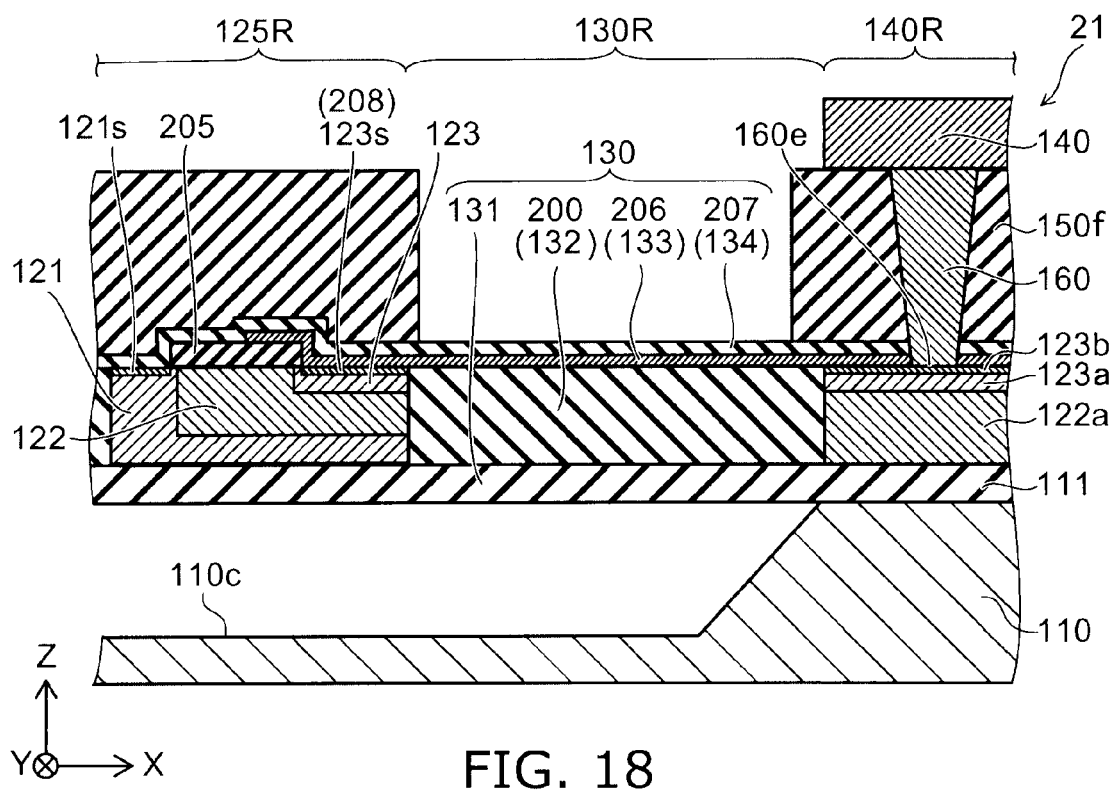
FIG. 18 is a sequential schematic sectional view showing a method for manufacturing an infrared imaging device.

Then, as shown in FIG. 18, the surface portion of the substrate 110 is etched via the through hole to form a void 110c between the support beam 130 and the thermoelectric converting section 120 on one hand and the substrate 110 on the other. Thus, an infrared imaging device 21 according to the second practical example is formed.

Figure 19:
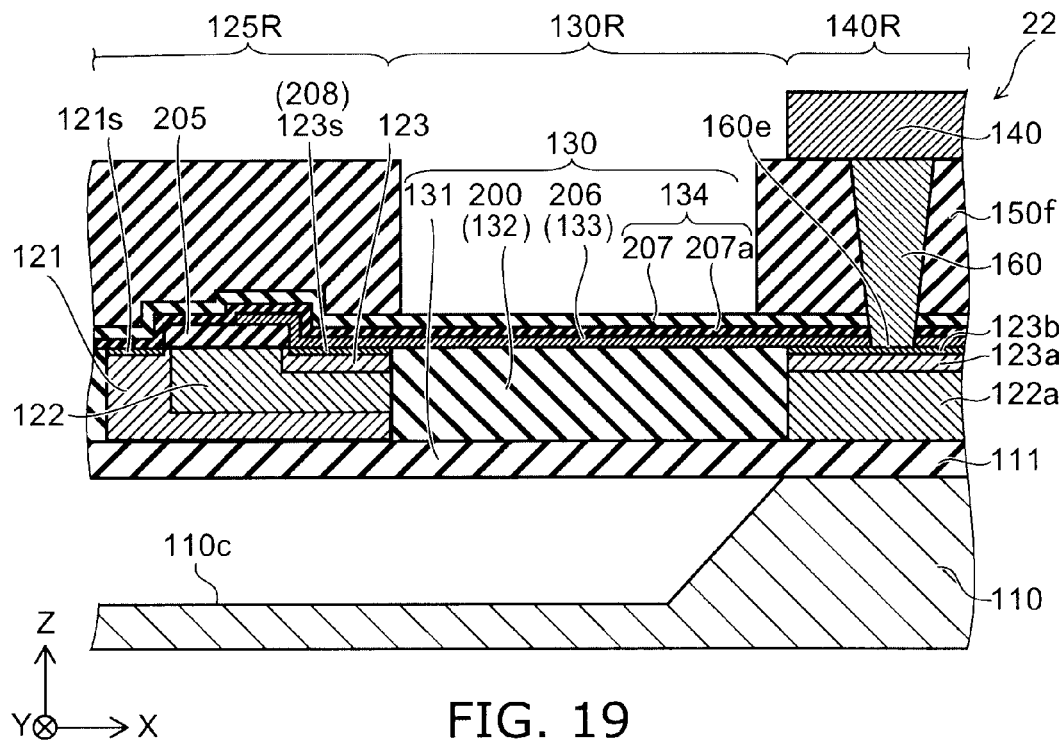
FIG. 19 is a schematic sectional view showing an infrared imaging device.

FIG. 19 is a schematic sectional view illustrating the configuration of an alternative infrared imaging device according to the second practical example.

As shown in FIG. 19, in the alternative infrared imaging device 22 according to the second practical example, the support beam covering layer 134 includes the aforementioned silicon nitride film 207 and an insulating film 207a provided between the silicon nitride film 207 and the support beam interconnection 133. The remaining configuration is similar to that of the infrared imaging device 21, and hence the description thereof is omitted.

In the infrared imaging device 22, the support beam covering layer 134 has a two-layer structure of the silicon nitride film 207 functioning as an etching stopper and the insulating film 207a. For instance, the material (including the film formation method) used for the insulating film 207a and the film thickness of the insulating film 207a can be controlled so that the film stress in the support beam 130 is canceled in the vertical direction (Z-axis direction). More specifically, the material (including the film formation method) and film thickness used for the support beam covering layer 134 (in the specific example, silicon nitride film 207 and insulating film 207a) located on the upper surface of the support beam interconnection 133 and the layer (in the specific example, support beam lower side insulating layer 131 and support beam intermediate insulating layer 132) located on the lower surface of the support beam interconnection 133 can be controlled to reduce the vertical film stress applied to the support beam 130. This can suppress e.g. warpage of the support beam interconnection 133. Thus, the operation of the infrared imaging device can be made more accurate.

The infrared imaging device 22 can be fabricated by forming an insulating film 207a on the conductive film 206 before the formation of the silicon nitride film 207 described with reference to FIG. 15. The other processes can be made similar to those of the infrared imaging device 21.

The aforementioned insulating film 207a may be a monolayer film or a stacked film. The aforementioned insulating film 207a is applicable to arbitrary infrared imaging devices according to the embodiment as long as technically feasible.

(Third Embodiment)

Figure 20:
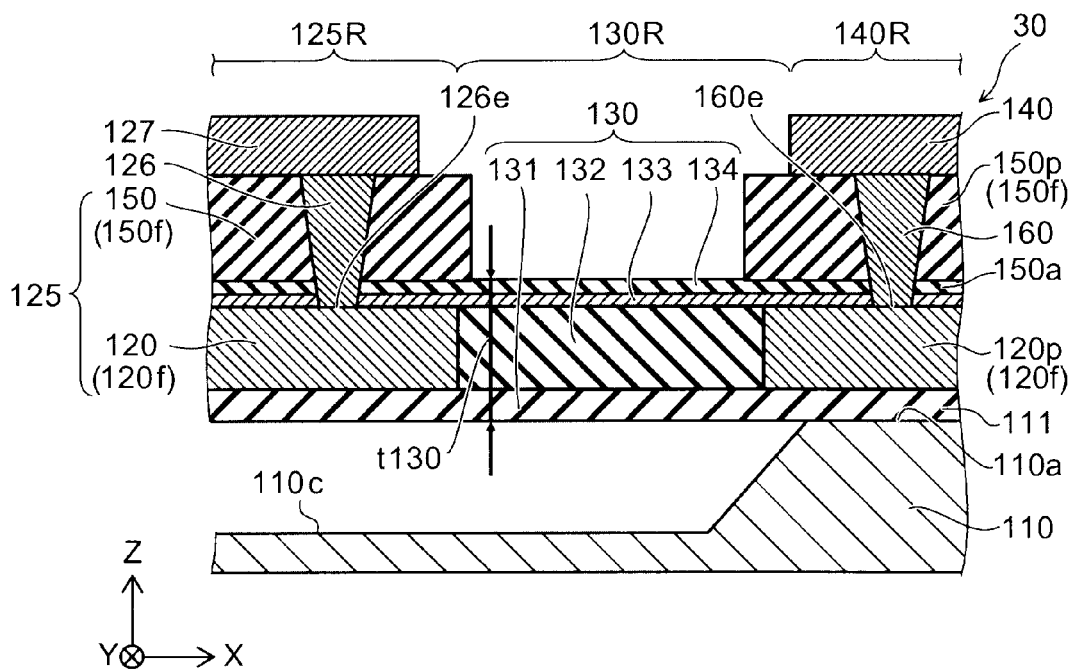
FIG. 20 is a schematic sectional view showing an infrared imaging device.

FIG. 20 is a schematic sectional view illustrating the configuration of an infrared imaging device according to a third embodiment.

As shown in FIG. 20, in the infrared imaging device 30 according to the embodiment, the detecting section 125 further includes a detection region interconnection 127 and a detection region connecting section 126. The remaining configuration can be made similar to that of the infrared imaging device 20 according to the second embodiment, and hence the description thereof is omitted. The detection region interconnection 127 and the detection region connecting section 126 may also be provided in the infrared imaging device 10 according to the first embodiment.

The detection region interconnection 127 is provided on the infrared absorbing section 150 (on the side opposite to the substrate 110). As described above, in the case where one detecting section 125 includes a plurality of thermoelectric conversion elements (e.g., pn junction diodes), the detection region interconnection 127 connects the plurality of thermoelectric conversion elements to each other.

The detection region connecting section 126 is electrically connected to the detection region interconnection 127, extends from the detection region interconnection 127 toward the substrate 110, and is connected to the support beam interconnection 133 at the end 126e on the substrate 110 side. The detection region connecting section 126 is e.g. a contact plug for connecting the detection region interconnection 127 and the support beam interconnection 133.

The distance (distance along the Z-axis direction) between the end 160e on the substrate 110 side of the contact plug 160 and the major surface 110a of the substrate 110 is substantially equal to the distance (distance along the Z-axis direction) between the end 126e on the substrate 110 side of the detection region connecting section 126 and the major surface 110a of the substrate 110.

That is, as viewed from the substrate 110 (the major surface 110a of the substrate 110), the height of the lower end 160e of the contact plug 160 connected to the support beam interconnection 133 and the height of the lower end 126e of the detection region connecting section 126 connected to the support beam interconnection 133 are substantially equal.

Thus, as viewed from the substrate 110, the height of the lower end 160e of the contact plug 160 and the height of the lower end 126e of the detection region connecting section 126 are made substantially equal. Hence, the height of the layers connected with the support beam interconnection 133 is made substantially equal. Thus, the surfaces of the layers connected with the support beam interconnection 133 are flattened. This improves the flatness of the foundation of the conductive layer (e.g., thin film metal layer) used for the support beam interconnection 133, and can suppress the step disconnection of the support beam interconnection 133. Hence, the embodiment can provide an infrared solid-state imaging device having high sensitivity and high reliability.

THIRD PRACTICAL EXAMPLE

In the following, a method for manufacturing an infrared imaging device of a third practical example according to the embodiment is described. In the third practical example, the process of FIGS. 4 to 9 described with reference to the first practical example can be made similar to that of the first practical example. Hence, the process subsequent thereto is described.

Figure 21:
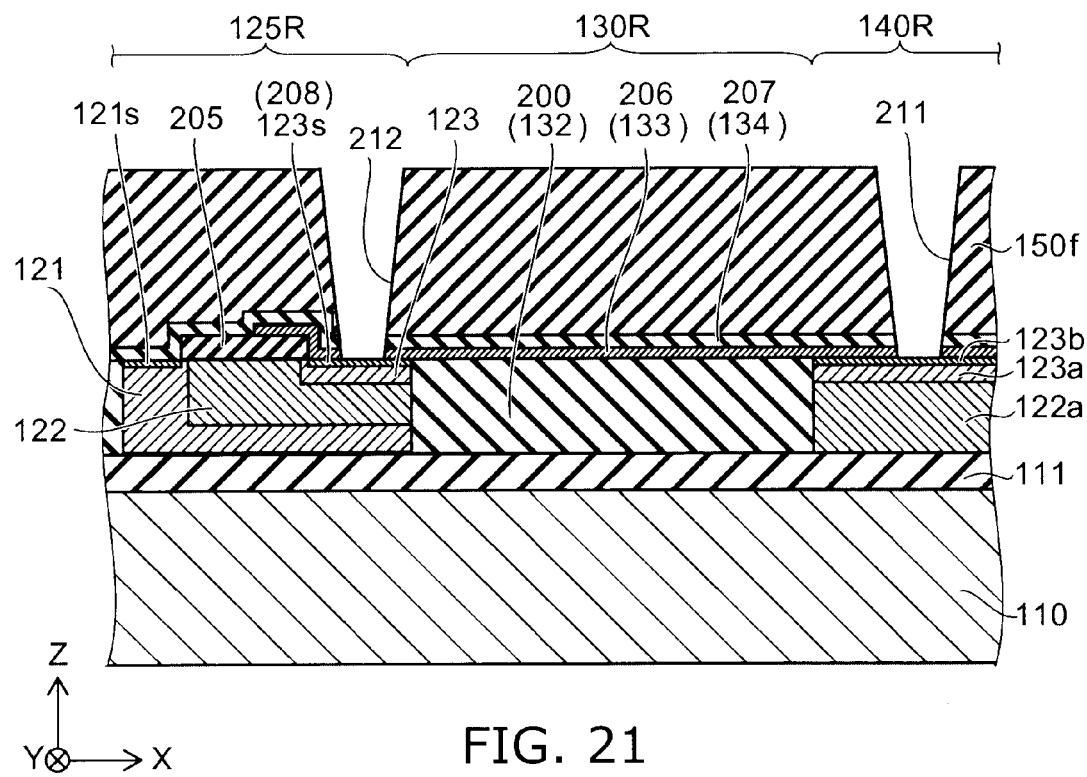
FIG. 21 is a sequential schematic sectional view showing a method for manufacturing an infrared imaging device.
Figure 22:
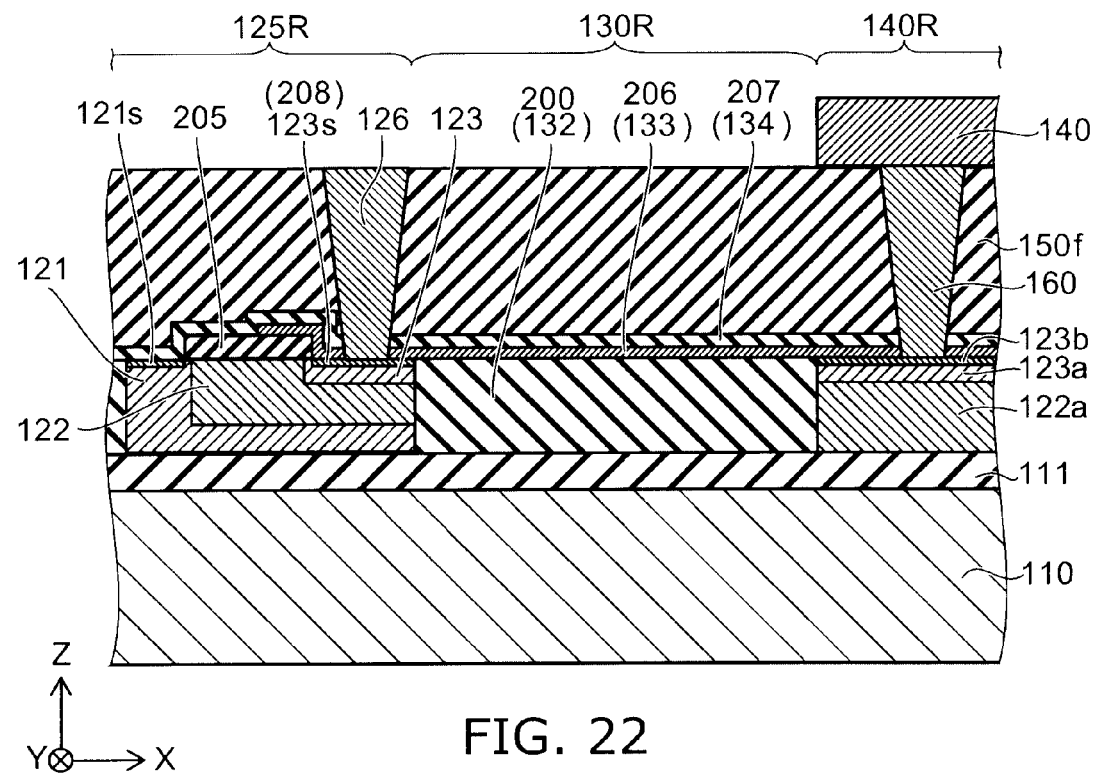
FIG. 22 is a sequential schematic sectional view showing a method for manufacturing an infrared imaging device.
Figure 23:
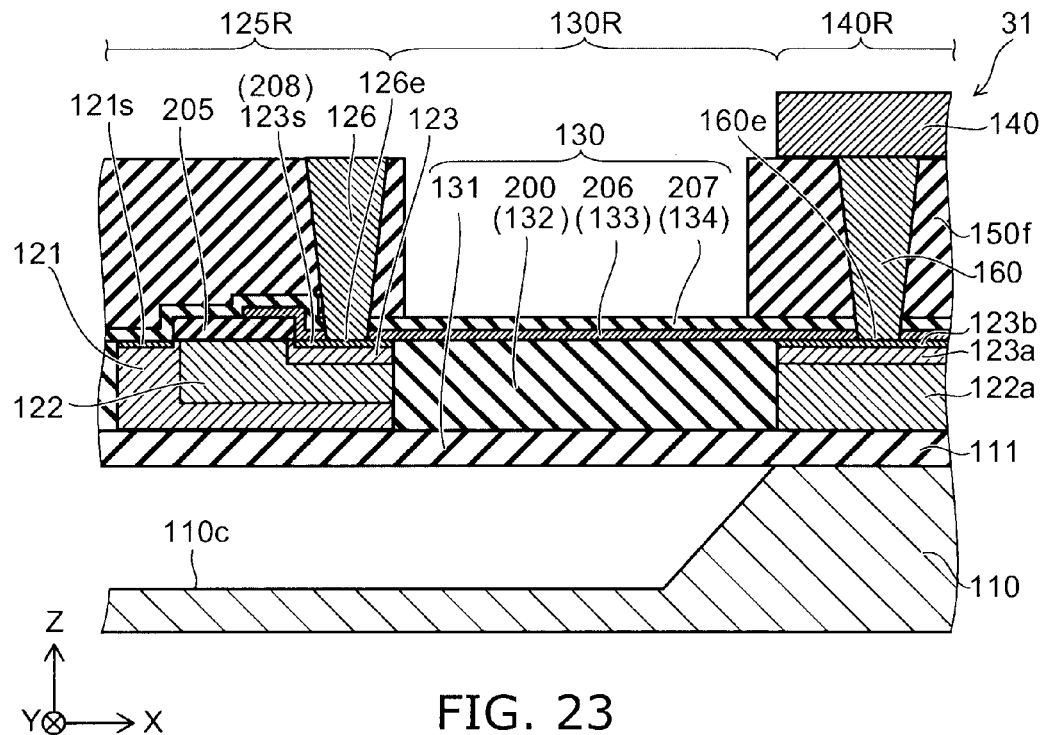
FIG. 23 is a sequential schematic sectional view showing a method for manufacturing an infrared imaging device.

FIGS. 21 to 23 are sequential schematic sectional views illustrating the method for manufacturing an infrared imaging device according to the third practical example.

As shown in FIG. 21, after the process described with reference to FIG. 9, as in the second practical example, the resist layer 209 is stripped. Then, on the conductive film 206, a silicon nitride film 207 (covering layer 150a functioning as an etching stopper film) is formed. Subsequently, on the silicon nitride film 207, a stacked film of a silicon oxide film and a silicon nitride film constituting an infrared absorption layer 150f is formed.

Then, in the interconnection region 140R, a contact hole 211 extending from the upper surface of the infrared absorption layer 150f to the support beam interconnection 133 is formed. More specifically, the contact hole 211 is connected to the portion of the support beam interconnection 133 corresponding to the $n^+$-diffusion layer 123a (interconnection region silicide film 123b).

Furthermore, in the detection region 125R, a contact hole 212 extending from the upper surface of the infrared absorption layer 150f to the support beam interconnection 133 is formed. More specifically, the contact hole 212 is connected to the portion of the support beam interconnection 133 corresponding to the $n^+$-diffusion layer region 123 (detection region silicide film 123s).

Next, as shown in FIG. 22, a conductive layer is embedded in the contact holes 211 and 212 and planarized by CMP to form a contact plug 160 and a detection region connecting section 126. Subsequently, an interconnection 140 made of e.g. an aluminum alloy is formed.

Next, as in the second practical example, the infrared absorption layer 150f in the support region 130R is removed. Then, a through hole (not shown) penetrating to the major surface 110a of the substrate 110 is formed. The surface portion of the substrate 110 is etched via the through hole to form a void 110c between the support beam 130 and the thermoelectric converting section 120 on one hand and the substrate 110 on the other.

Thus, an infrared imaging device 31 according to the third practical example having the configuration illustrated in FIG. 23 is formed.

In the practical example, the layer (interconnection region silicide film 123b) on the substrate 110 side of the support beam interconnection 133 connected with the contact plug 160, and the layer (detection region silicide film 123s) on the substrate 110 side of the support beam interconnection 133 connected with the detection region connecting section 126, are silicidized. That is, the practical example includes an interconnection region silicide film 123b provided between the substrate 110 and the support beam interconnection 133 and being in contact with the support beam interconnection 133 and the contact plug 160, and a detection region silicide film 123s provided between the substrate 110 and the support beam interconnection 133 and being in contact with the support beam interconnection 133 and the detection region connecting section 126. Thus, even in the case where the support beam interconnection 133 is thin, the formation of the support beam interconnection 133, the connection between the contact plug 160 and the support beam interconnection 133, and the connection between the detection region connecting section 126 and the support beam interconnection 133 are stabilized. This improves the reliability, and improves the yield and other productivity.

Hence, the practical example can provide an infrared solid-state imaging device having high sensitivity, high reliability, and high productivity.

FOURTH PRACTICAL EXAMPLE

Figure 24:
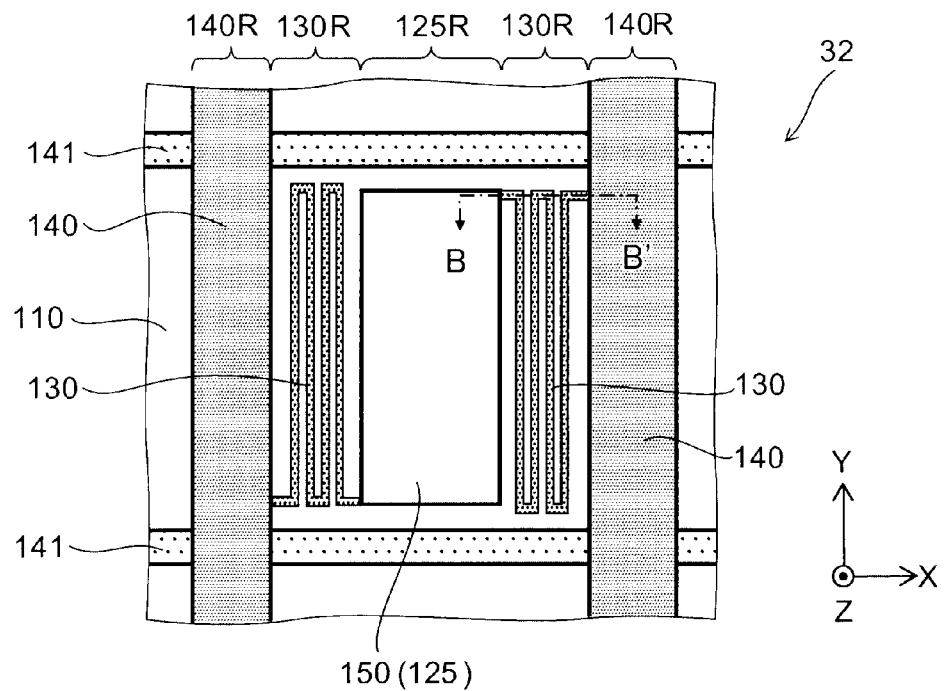
FIG. 24 is a schematic plan view showing an infrared imaging device.

FIG. 24 is a schematic plan view illustrating the configuration of an infrared imaging device according to a fourth practical example.

As shown in FIG. 24, in the infrared imaging device 32 according to the fourth practical example, the support beam 130 has a folded meandering structure. Hence, the support beam 130 can be configured in a slim and long shape, and can suppress thermal conduction. Thus, in the embodiment, the pattern of the support beam 130 is arbitrary.

In this figure, a cross interconnection 141 crossing the interconnection 140 is also depicted.

The method for manufacturing the infrared imaging device 32 of the practical example can be made similar to that of the third practical example in the process of FIGS. 21 and 22 described with reference to the third practical example. Hence, the process subsequent thereto is described.

Figure 25:
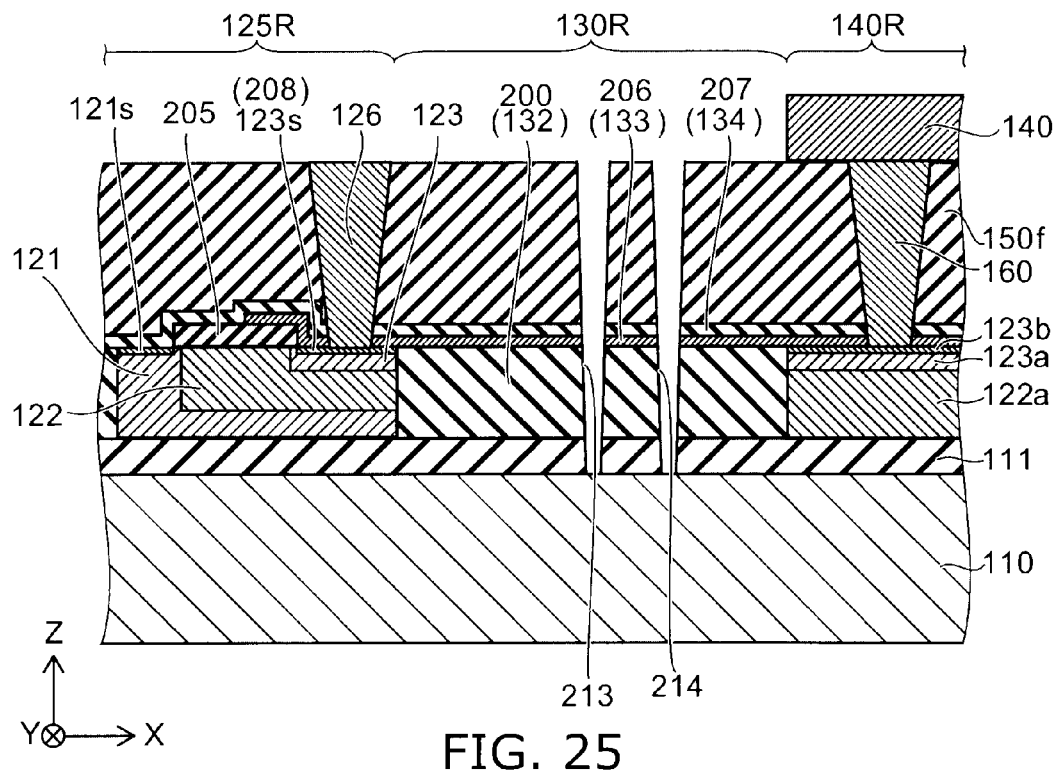
FIG. 25 is a sequential schematic sectional view showing a method for manufacturing the infrared imaging device.
Figure 26:
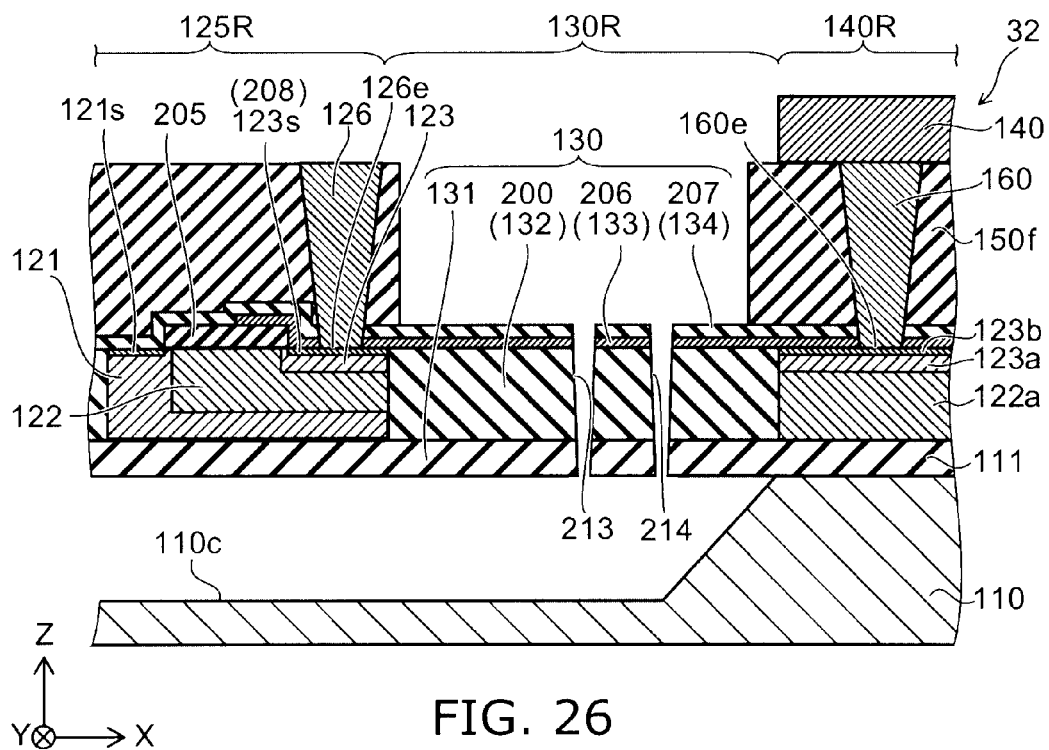
FIG. 26 is a sequential schematic sectional view showing a method for manufacturing the infrared imaging device.

FIGS. 25 and 26 are sequential schematic sectional views illustrating the method for manufacturing the infrared imaging device according to the fourth practical example. That is, these figures are sectional views corresponding to the cross section taken along line B-B' of FIG. 24.

As shown in FIG. 25, after the process described with reference to FIG. 22, the infrared absorption layer 150f in the support region 130R is removed. Then, a trench 213 and 214 penetrating to the major surface 110a of the substrate 110 is formed. By this trench 213 and 214, the pattern shape having the meandering structure of the support beam 130 is formed.

Then, as shown in FIG. 26, the surface portion of the substrate 110 is etched via the trench 213 and 214 to form a void 110c between the support beam 130 and the thermoelectric converting section 120 on one hand and the substrate 110 on the other. Thus, an infrared imaging device 32 according to the fourth practical example is formed.

Figure 27:
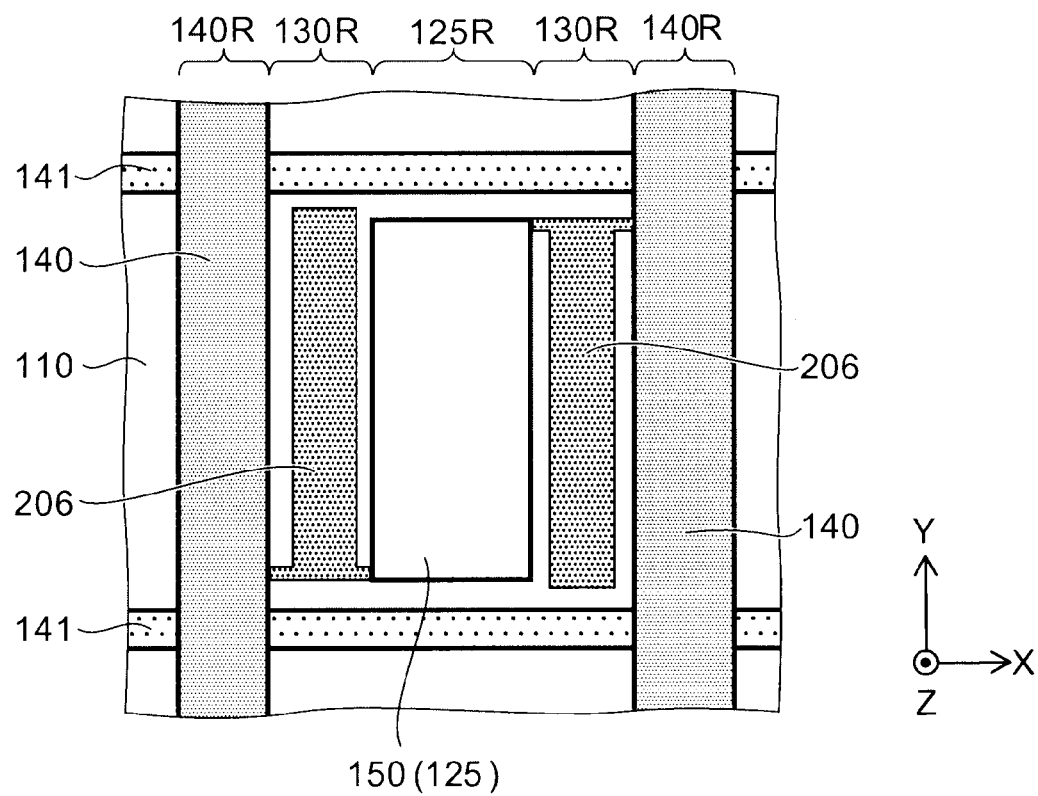
FIG. 27 is a sequential schematic plan view illustrating a method for manufacturing the infrared imaging device.

FIG. 27 is a schematic plan view illustrating an alternative method for manufacturing the infrared imaging device according to the fourth practical example.

More specifically, this figure illustrates the process of forming a conductive film 206, which is one process in the method for manufacturing the infrared imaging device 32.

As shown in FIG. 27, in the specific example, the conductive film 206 is formed in a pattern extensively covering the support region 130R. In this case, in the process illustrated in FIG. 25, the pattern of the support beam 130 is collectively formed. Thus, there is no pattern misalignment between the conductive film 206 and the upper and lower insulating films.

Hence, no lateral stress variation occurs due to the bimorph effect. This has the advantage of enabling high accuracy operation.

(Fourth Embodiment)

The fourth embodiment relates to a method for manufacturing an infrared imaging device. More specifically, the manufacturing method according to the embodiment is a method for manufacturing an infrared imaging device including a substrate 110; a detecting section 125 including an infrared absorbing section 150 provided above and spaced from the substrate 110 and configured to absorb infrared radiation, and a thermoelectric converting section 120 provided between the infrared absorbing section 150 and the substrate 110, spaced from the substrate 110, thermally connected to the infrared absorbing section 150, and configured to convert temperature change due to the infrared radiation absorbed in the infrared absorbing section 150 to an electrical signal; an interconnection 140 provided above the substrate 110 and configured to transmit the electrical signal; a contact plug 160 electrically connected to the interconnection 140 and extending from the interconnection 140 toward the substrate 110; and a support beam 130 including an support beam interconnection 133 and supporting the detecting section 125 above the substrate 110, the support beam interconnection 133 being configured to transmit the electrical signal from the thermoelectric converting section 120 via the contact plug 160 to the interconnection 140.

Figure 28:
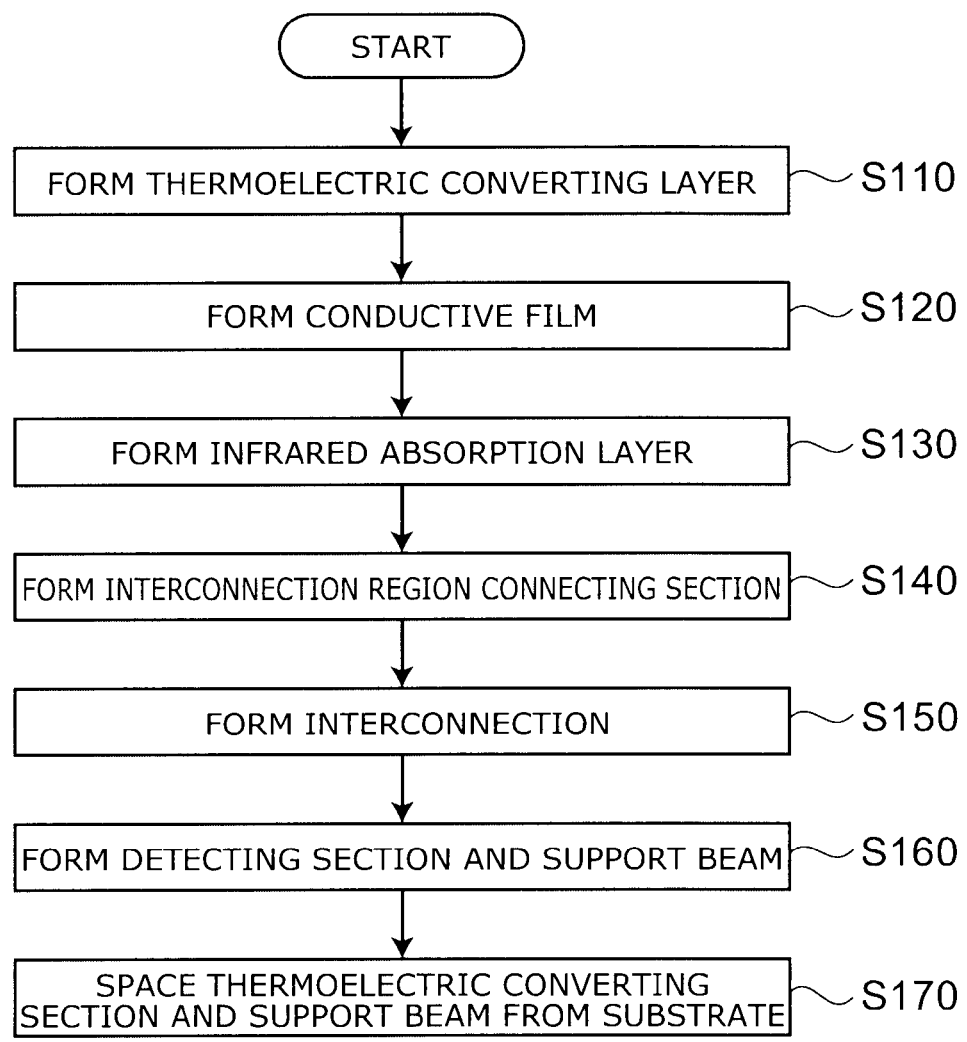
FIG. 28 is a flow chart illustrating a method for manufacturing an infrared imaging device.

FIG. 28 is a flow chart illustrating the method for manufacturing an infrared imaging device according to the fourth embodiment.

As shown in FIG. 28, the manufacturing method according to the embodiment includes a first process (step S110) for forming a semiconductor layer 120f constituting a thermoelectric converting section 120 on a substrate 110, a second process (step S120) for forming a conductive film 206 constituting a support beam interconnection 133 on the semiconductor layer 120f, a third process (step S130) for forming an infrared absorption layer 150f constituting an infrared absorbing section 150 on the conductive film 206, a fourth process (step S140) for forming a contact plug 160 by forming a contact hole 211 reaching the conductive film 206 in an interconnection region 140R which is a portion of the infrared absorption layer 150f where an interconnection 140 is to be located, and then embedding a conductive material in the contact hole 211, a fifth process (step S150) for forming the interconnection 140 on the contact plug 160, a sixth process (step S160) for forming a detecting section 125 including the infrared absorbing section 150 and the thermoelectric converting section 120, and a support beam 130 including the support beam interconnection 133 by processing the infrared absorption layer 150f, the semiconductor layer 120f, and the conductive film 206, and a seventh process (step S170) for spacing the thermoelectric converting section 120 and the support beam 130 from the substrate 110 by removing a portion of the substrate 110 opposed to the thermoelectric converting section 120 and the support beam 130.

Specifically, the processes described with reference to FIGS. 4 to 13, FIGS. 15 to 18, FIGS. 21 to 23, and FIGS. 25 to 27 are performed. Thus, an infrared imaging device with high sensitivity can be manufactured.

The embodiments provide an infrared imaging device having high sensitivity and a method for manufacturing the same.

In the specification of the application, "perpendicular" and "parallel" refer to not only strictly perpendicular and strictly parallel but also include, for example, the fluctuation due to manufacturing processes, etc. It is sufficient to be substantially perpendicular and substantially parallel.

The embodiments of the invention have been described above with reference to examples. However, the invention is not limited to these examples. For instance, the shape, size, material, arrangement and the like of the specific configurations of various components such as the substrate, infrared absorbing section, thermoelectric converting section, detecting section, interconnection, contact plug, support beam interconnection, support beam, detection region interconnection, and detection region connecting section included in the infrared detecting device can be variously modified by those skilled in the art. Such modifications are encompassed within the scope of the invention as long as those skilled in the art can similarly practice the invention and achieve similar effects by suitably selecting such configurations from conventionally known ones.

Further, any two or more components of the specific examples may be combined within the extent of technical feasibility and are included in the scope of the invention to the extent that the purport of the invention is included.

In addition, those skilled in the art can suitably modify and implement the infrared imaging device and the method for manufacturing the same described above in the embodiments of the invention. All the infrared imaging devices and the methods for manufacturing the same thus modified are also encompassed within the scope of the invention as long as they fall within the spirit of the invention.

Various other variations and modifications can be conceived by those skilled in the art within the spirit of the invention, and it is understood that such variations and modifications are also encompassed within the scope of the invention.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention.

What is claimed is:

1. An infrared imaging device comprising:
   a substrate having a detection region, an interconnection region and support region provided between the detection region and the interconnection region, the substrate having a connection layer provided in the interconnection region;
   a detecting section provided on the detection region, the detection section including:
      an infrared absorbing section provided above and spaced from the substrate and configured to absorb infrared radiation; and
      a thermoelectric converting section provided between the infrared absorbing section and the substrate, spaced from the substrate, thermally connected to the infrared absorbing section, and configured to convert temperature change due to the infrared radiation absorbed in the infrared absorbing section to an electrical signal;
   an interconnection provided on the interconnection region and configured to read the electrical signal;
   a contact plug extending from the interconnection toward the connection layer, the contact plug being electrically connected to the interconnection and the connection layer, the contact plug having a first end on a side of the substrate; and
   a support beam provided above the interconnection region, the support beam including a support beam interconnection and supporting the detecting section above the substrate, a first end portion of the support beam interconnection being connected to the first end a second end portion of the support beam interconnection being directly connected to the thermoelectric converting section, the support beam interconnection extending at a height of the first end in a plane perpendicular to a direction from the substrate toward the detecting section, and the support beam interconnection being configured to transmit the electrical signal from the thermoelectric converting section via the contact plug to the interconnection.

2. The device according to claim 1, wherein the support beam further includes an etching stopper film stacked on the support beam interconnection on a side opposite to the substrate of the support beam interconnection, etching rate of the etching stopper film by an etchant for etching a layer constituting the infrared absorbing section being lower than etching rate of the support beam interconnection.

3. The device according to claim 2, further comprising:
   an insulating film provided between the etching stopper film and the support beam interconnection.

4. The device according to claim 2, wherein the etching stopper film includes a silicon nitride film.

5. The device according to claim 1, wherein
   the detecting section further includes:
   a detection region interconnection provided on an opposite side of the infrared absorbing section from the substrate; and
   a detection region connecting section electrically connected to the detection region interconnection, extending from the detection region interconnection toward the substrate, and the detection region connecting section has a second end on a side of the substrate, the second end being connected to the support beam interconnection, and
   a distance between the first end and a major surface of the substrate is equal to a distance between the second end and the major surface.

6. The device according to claim 1, wherein the infrared absorbing section includes an infrared absorption layer made of at least one of a silicon oxide film and a silicon nitride film.

7. The device according to claim 5, further comprising:
   an interconnection region silicide film provided between the substrate and the support beam interconnection and being in contact with the support beam interconnection and the contact plug; and
   a detection region silicide film provided between the substrate and the support beam interconnection and being in contact with the support beam interconnection and the detection region connecting section.

8. The device according to claim 6, wherein the infrared absorption layer includes a stacked film of a silicon oxide film and a silicon nitride film.

9. The device according to claim 1, wherein a resistance of the support beam interconnection is higher than a resistance of the interconnection.

10. The device according to claim 9, wherein
   the support beam interconnection includes at least one of Ti, Co, and Ni, and
   the interconnection includes an aluminum alloy.

11. The device according to claim 1, wherein
a region on the substrate provided with the detecting section is defined as a detection region, and a region on the substrate provided with the interconnection is defined as an interconnection region, and
a material of a first intermediate layer between the support beam interconnection and the substrate in the interconnection region is identical to a material of a second intermediate layer between the support beam interconnection and the substrate in the detection region.

12. The device according to claim 11, wherein the first intermediate layer and the second intermediate layer include a single crystal silicon layer.

13. The device according to claim 11, wherein
the support beam further includes an intermediate insulating layer provided between the first intermediate layer and the second intermediate layer, and
the intermediate insulating layer fills a gap between the first intermediate layer and the second intermediate layer and isolates the first intermediate layer and the second intermediate layer from each other.

14. The device according to claim 1, wherein
a lower face of the second end portion of the support beam interconnection directly contacts at least a part of an upper face of thermoelectric converting section.

15. An infrared imaging device comprising:
a substrate having a detection region, an interconnection region and support region provided between the detection region and the interconnection region, the substrate having a connection layer provided in the interconnection region;
a detecting section provided on the detection region, the detection section including:
an infrared absorbing section provided above and spaced from the substrate and configured to absorb infrared radiation; and
a thermoelectric converting section provided between the infrared absorbing section and the substrate, spaced from the substrate, thermally connected to the infrared absorbing section, and configured to convert temperature change due to the infrared radiation absorbed in the infrared absorbing section to an electrical signal;
a silicide film provided on a part of the thermoelectric converting section and contacting the part of the thermoelectric converting section;
an interconnection provided on the interconnection region and configured to read the electrical signal;
a contact plug extending from the interconnection toward the connection layer, the contact plug being electrically connected to the interconnection and the connection layer, the contact plug having a first end on a side of the substrate; and
a support beam provided above the interconnection region, the support beam including a support beam interconnection and supporting the detecting section above the substrate, a first end portion of the support beam interconnection being connected to the first end, a second end portion of the support beam interconnection being directly connected to the silicide film, the support beam interconnection extending at a height of the first end in a plane perpendicular to a direction from the substrate toward the detecting section, and the support beam interconnection being configured to transmit the electrical signal from the thermoelectric converting section via the contact plug to the interconnection.

16. The device according to claim 15, wherein the connection layer includes an $n^+$-diffusion layer provided in the interconnection region.

17. The device according to claim 16, wherein the connection layer further includes a silicide film provided on the $n^+$-diffusion layer.

18. The device according to claim 16, wherein
a lower face of the second end portion of the support beam interconnection directly contacts at least a part of an upper face of the silicide film.

* * * * *